United States Patent [19]

Ota

[11] Patent Number: 5,732,739
[45] Date of Patent: Mar. 31, 1998

[54] FOUR-WAY CHANGE-OVER VALVE FOR AIR-CONDITIONER AND SERVICE VALVE THEREWITH

[75] Inventor: Manabu Ota, Ogaki, Japan

[73] Assignee: Pacific Engineering Co., Ltd., Ogaki, Japan

[21] Appl. No.: 470,264

[22] Filed: Jun. 6, 1995

Related U.S. Application Data

[62] Division of Ser. No. 147,775, Nov. 5, 1993, Pat. No. 5,462,085.

[30] Foreign Application Priority Data

| Jan. 25, 1993 | [JP] | Japan | 5-5392 |
| Feb. 27, 1993 | [JP] | Japan | 5-63525 |
| Mar. 18, 1993 | [JP] | Japan | 5-85627 |
| Mar. 23, 1993 | [JP] | Japan | 5-89308 |
| Mar. 23, 1993 | [JP] | Japan | 5-89309 |

[51] Int. Cl.⁶ .................................................. F16K 11/07
[52] U.S. Cl. ............................ 137/625.46; 251/214
[58] Field of Search ..................... 137/625.46; 251/214

[56] References Cited

U.S. PATENT DOCUMENTS

| 3,131,706 | 5/1964 | Harban | 137/625.46 X |
| 3,834,537 | 9/1974 | Brett | 137/625.46 X |
| 4,139,355 | 2/1979 | Turner et al. | 137/625.43 X |

FOREIGN PATENT DOCUMENTS

| 56-162363 | 12/1981 | Japan. |
| 58-127276 | 8/1983 | Japan. |
| 59-81868 | 6/1984 | Japan. |
| 59-155669 | 9/1984 | Japan. |
| 59-33966 | 9/1984 | Japan. |
| 60-11074 | 1/1985 | Japan. |
| 5-41910 | 6/1993 | Japan. |
| 5-41911 | 6/1993 | Japan. |

*Primary Examiner*—John Fox
*Attorney, Agent, or Firm*—David G. Conlin; William J. Daley, Jr.

[57] ABSTRACT

A four-way change-over valve for an air conditioner has first to fourth piping holes sequentially arranged on a concentric circle at a predetermined pitch in a planar portion of a valve seat formed in a thick disk shape as one portion of a valve case. The change-over valve also has a rotary valve rotatably arranged on an upper face of this valve seat and having at least one communicating groove for independently connecting two adjacent piping holes of the four piping holes to each other. Cooling and heating operations of the air conditioner are switched by rotating the rotary valve. A service valve with a four-way change-over valve for an air conditioner is characterized in that both service valves on liquid and gas sides of a refrigerant circuit are integrated with each other and are further integrated with the four-way change-over valve as one valve unit with one valve seat as a common valve seat. In accordance with such valve structures, the four-way change-over valve has a simplified structure and is made compact.

5 Claims, 18 Drawing Sheets

FOUR-WAY CHANGE-OVER VALVE FOR AIR-CONDITIONER AND SERVICE VALVE THEREWITH

This is a Divisional Application of application Ser. No. 08/147,775, filed Nov. 5, 1993, now U.S. Pat. No. 5,462,085.

BACKGROUND OF THE INVENTION

1. Field of the Invention

The present invention relates to a four-way change-over valve for an air conditioner used to switch cooling and heating operations in the air conditioner utilizing a refrigerating cycle of a heat pump type. The present invention also relates to a service valve with a four-way change-over valve for an air conditioner. The present invention further relates to a valve attached to an outdoor unit of an air conditioner of a separating type in which the same piping function is fulfilled by using one compact valve instead of two general valves.

2. Description of the Related Art

In the general structure of a four-way change-over valve utilizing a refrigerant pressure, a valve sheet having a U-shape in cross section and the same curved surface as a cylinder must be accurately soldered to a central lower portion of a cylinder. Further, this structure has a connecting means for connecting a valve slide arranged on an upper face of the valve sheet to a piston rod or a bracket such that the valve slide is set in a press contact state at any time and can be smoothly slid. This structure also has a fixing means for fixing piston rings to both ends of the piston rod. However, operability of each of the connecting and fixing means is greatly reduced since the valve slide is located in a central portion of the cylinder.

In this structure, differences in pressure between chambers of the cylinder are caused by using magnetomotive force as attractive force and resilient force of a spring as repulsive force in a switching operation of the change-over valve and one generation of the magnetomotive force and demagnetization. Thus, the valve slide is slid at all strokes. Accordingly, in a heating state of an air conditioner, no pressure differences between the chambers for making a heating circuit can be held unless an electric current continuously flows through a solenoid. Therefore, no valve slide can be held in the heating state.

In a change-over valve using a wax type thermoelement, pressures with the chambers are increased by heating the thermoelement in a driving source. Accordingly, an error in operation of the change-over valve tends to be caused, or a switching operation of the change-over valve tends to be unstable by the influence of an outside air temperature. Further, performance of the change-over valve is greatly influenced by a seal state between a shaft in a shaft core portion and the wax type thermoelement. However, it is very difficult to reliably seal the shaft and the wax type thermoelement when the change-over valve is manufactured. As a result, cost of the change-over valve is increased.

In a change-over valve using a stepping motor, etc., the stepping motor is very expensive so that cost of the four-way change-over valve is increased.

In each of change-over valves shown in Japanese Utility Model Application Laying Open (KOKAI) No. 58-127276 and Japanese Patent Application Laying Open (KOKAI) No. 59-155669, an electromagnetic coil is arranged outside a device body through a pipe-shaped guide. A plunger is inserted into this guide and a valve body within the device body is swung through an operating plate. Therefore, the device body is made compact, but the electromagnetic coil is large-sized so that the electromagnetic coil projects toward the exterior of the device body. Accordingly, the device body and the electromagnetic coil are unbalanced. Further, it is very troublesome to airtightly connect the device body to the electromagnetic coil through the guide. Accordingly, such a structure is not practically used.

In another general valve structure, two valves are attached onto the side of an outdoor unit of a general air conditioner of a separating type. The two valves are composed of a ⅜" valve connected to a four-way change-over valve and a ¼" valve connected to a capillary tube. Piping of these valves is performed between the outdoor unit and an indoor unit when the air conditioner is arranged.

For example, Japanese Utility Model Application Laying Open (KOKAI) Nos. 61-54563 and 61-54564 show a proposed valve structure for integrating two valves as one valve unit.

In the general valve structure using two valves, the two valves are independently manufactured so that cost of the vane structure is increased and a wide space for attaching the valves is required. Further, a valve having a shaft shape is used within the valve structure so that the valve structure is increased in height. Further, there are no opening and closing displays with respect to the valves so that no operator can accurately attach the valves to the air conditioner unless the operator is a technical expert for attachment.

In the valve shown in each of Japanese Utility Model Application Laying Open (KOKAI) Nos. 61-54563 and 61-54564, one valve device body is formed in a cylindrical shape. However, a valve within this valve device body is constructed by a valve having a shaft shape. In Japanese Utility Model Application Laying Open (KOKAI) No. 61-54563, a main valve rod has a second valve rod therein and is mounted to the valve device body such that the main valve rod functions as two valves. In contrast to this, in Japanese Utility Model Application Laying Open (KOKAI) No. 61-54564, a ring-shaped valve body is formed such that an elongated central valve rod is inserted into a central portion of the ring-shaped valve body. This ring-shaped valve body is mounted to the valve device body. Connection holes formed in a central portion and a lower end portion of the valve device body are opened and closed by each of the valve rods. However, each of the valve structures in these two applications is complicated so that it takes much time and labor to process each of the valve structures.

Further, in each of these valve structures, the shaft-shaped valve is arranged as a double structure within the valve device body so that each of the valve structures is increased in height. Accordingly, piping connection holes connected to an indoor unit are directed outward so that no pipes are preferably arranged in appearance.

SUMMARY OF THE INVENTION

It is therefore a first object of the present invention to provide a compact four-way change-over valve for an air conditioner in which it is easy to process piping holes of a valve seat and assemble the four-way change-over valve and no complicated mechanism for utilizing a pressure difference is required.

A second object of the present invention is to provide a compact service valve with a four-way change-over valve manufactured easily and cheaply.

A third object of the present invention is to provide a compact valve for an air conditioner in which the valve has a good external appearance in an attaching state of this valve attached to the air conditioner and is easily treated and simply operated.

In accordance with a first structure of the present invention, the above first object can be achieved by a four-way change-over valve for an air conditioner comprising:

first to fourth piping holes sequentially arranged on a concentric circle at a predetermined pitch in a planar portion of a valve seat formed in a thick disk shape as one portion of a valve case; and a rotary valve rotatably arranged on an upper face of this valve seat and having at least one communicating groove for independently connecting two adjacent piping holes of the four piping holes to each other;

cooling and heating operations of the air conditioner being switched by rotating the rotary valve.

In accordance with a fourth structure of the present invention, the above first object can be also achieved by a four-way change-over valve for an air conditioner comprising:

first to fourth piping holes sequentially arranged on a concentric circle at an equal pitch in a planar portion of a valve seat formed in a thick disk shape as one portion of a valve case; and a rotary valve rotatably arranged on an upper face of this valve seat and symmetrically having communicating grooves for independently connecting two adjacent piping holes of the four piping holes to each other;

cooling and heating operations of the air conditioner being switched by rotating the rotary valve.

For example, a typical means for rotating the rotary valve is constructed by a compact DC motor. In this rotating means, a rotational speed of the DC motor is reduced by gears and an operating shaft is arranged in a central upper portion of the rotary valve. The rotary valve is rotated by rotating the operating shaft. In another rotating means, a tooth form may be arranged in an outer circumference of the rotary valve so that the rotary valve can be rotated by using this tooth form.

The two adjacent piping holes of the first to fourth piping holes can be mutually switched by rotating the rotary valve 90°. An operation of the four-way change-over valve will be explained in detail on the basis of embodiments of the present invention.

In accordance with a fifth structure of the present invention, the above second object can be achieved by a service valve with a four-way change-over valve for an air conditioner characterized in that both service valves on liquid and gas sides of a refrigerant circuit are integrated with each other and are further integrated with the four-way change-over valve as one valve unit with one valve seat as a common valve seat.

In accordance with a sixth structure of the present invention, the above second object can be also achieved by a service valve with a four-way change-over valve for an air conditioner comprising:

first to fourth piping holes formed on a lower face of a valve seat having a thick disk shape and sequentially arranged on a concentric circle at a predetermined pitch;

three piping holes among the four piping holes being communicated with a side portion of the valve seat; and a rotary valve rotatably arranged on the lower face of the valve seat and having one or two communicating grooves independently connecting two adjacent piping holes of the four piping holes to each other and symmetrically arranged;

cooling and heating operations of the air conditioner being switched by rotating the rotary valve;

the service valve further comprising:

two piping connection holes formed on an upper face of the valve seat such that the two piping connection holes are shifted from each other on a concentric circle;

one of the two piping connection holes being connected to a piping hole except for the three piping holes communicated with the side portion on the lower face of the valve seat;

the other piping connection hole being communicated with the side portion of the valve seat;

a disk shutter rotatably arranged on the upper face of the valve seat and having two passing holes in positions corresponding to the piping connection holes; and a shutter cover arranged above the disk shutter and having piping holes in positions corresponding to the two passing holes of the disk shutter;

cooling and heating operable states of the air conditioner and an operating state of the air conditioner except for the cooling and heating operable states being switched by rotating the disk shutter.

In accordance with a ninth structure of the present invention, the above second object can be also achieved by a service valve with a four-way change-over valve for an air conditioner comprising:

a valve chest formed in a central portion of a valve seat having a thick disk shape;

first to fourth piping holes each formed in an outer circumferential portion of the valve chest and sequentially arranged at a predetermined pitch in four directions;

three piping holes of the four piping holes being communicated with a side portion of the valve seat; and a rotary valve rotatably arranged within the valve chest in the central portion of the valve seat and independently connecting two adjacent piping holes among the four piping holes to each other;

cooling and heating operations of the air conditioner being switched by rotating the rotary valve;

the service valve further comprising:

two piping connection holes formed on an upper face of the valve seat such that the two piping connection holes are shifted from each other on a concentric circle;

one of the two piping connection holes being connected to a piping hole except for the three piping holes communicated with the side portion of the valve seat;

the other piping connection hole being communicated with the side portion of the valve seat;

a disk shutter rotatably arranged on the upper face of the valve seat and a housing passing holes in positions corresponding to the piping connection holes; and a shutter cover arranged above the disk shutter and having piping holes in positions corresponding to the two piping connection holes;

cooling and heating operable states of the air conditioner and an operating state of the air conditioner except for the cooling and heating operable states being switched by rotating the disk shutter.

In the above service valve with the four-way change-over valve in the present invention, two adjacent piping holes of the first to fourth piping holes on the lower face of the valve seat are mutually switched by rotating the rotary valve 90° so that cooling and heating operations of the air conditioner can be switched. The disk shutter on the upper face of the valve seat is rotated by rotating a driving shaft from the exterior of the shutter cover. Thus, it is possible to suitably and selectively switch communicating states of the two piping connection holes on the upper face of the valve seat and the two piping holes of the shutter cover.

Accordingly, when the air conditioner is arranged and moved, all operations of the air conditioner can be performed by only changing rotational positions of the disk shutter through the driving shaft in discharge of air and collection of refrigerant.

The above third object can be achieved by a fourteenth structure of the present invention. In the fourteenth structure, a valve body is formed in the shape of a flat case and a disk shutter having two passing holes is rotatably arranged within the valve body. Communicating holes are switched by rotating the disk shutter. Further, piping connection holes are formed on a side face of the flat case valve body so that the entire valve is made compact.

Namely, in accordance with the fourteenth structure of the present invention, the above third object can be achieved by a valve for an air conditioner comprising:

a flat valve case having a circular recessed portion with a shallow bottom on an upper face thereof and having two piping connection holes shifted from each other at a phase angle of 90° or 120° on a concentric circle;

a disk shutter rotatably arranged within the circular recessed portion of the flat valve case and having passing holes in positions corresponding to the piping connection holes;

the disk shutter further having a driving shaft in a central portion thereof; and a valve cover having piping holes in positions corresponding to the two piping connection holes;

the valve cover further having a shaft hole in a central portion thereof formed such that the driving shaft can be rotatably fitted into this shaft hole; and the valve cover being fixed to the valve case such that the valve cover airtightly covers the disk shutter and the driving shaft from above.

In the fourth structure of the present invention, the disk shutter within the valve case is rotated by rotating the driving shaft from the exterior of the valve cover. Thus, it is possible to suitably and selectively switch communicating states of the piping connection holes on a lower face of the valve case and the piping holes of the valve cover.

Accordingly, when the air conditioner is arranged and moved, all operations of the air conditioner can be performed by only changing rotational positions of the disk shutter through the driving shaft in discharge of air and collection of refrigerant.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a four-way change-over valve for an air conditioner and a service valve therewith in the present invention will next be described in detail with reference to the accompanying drawings.

Figure 1:
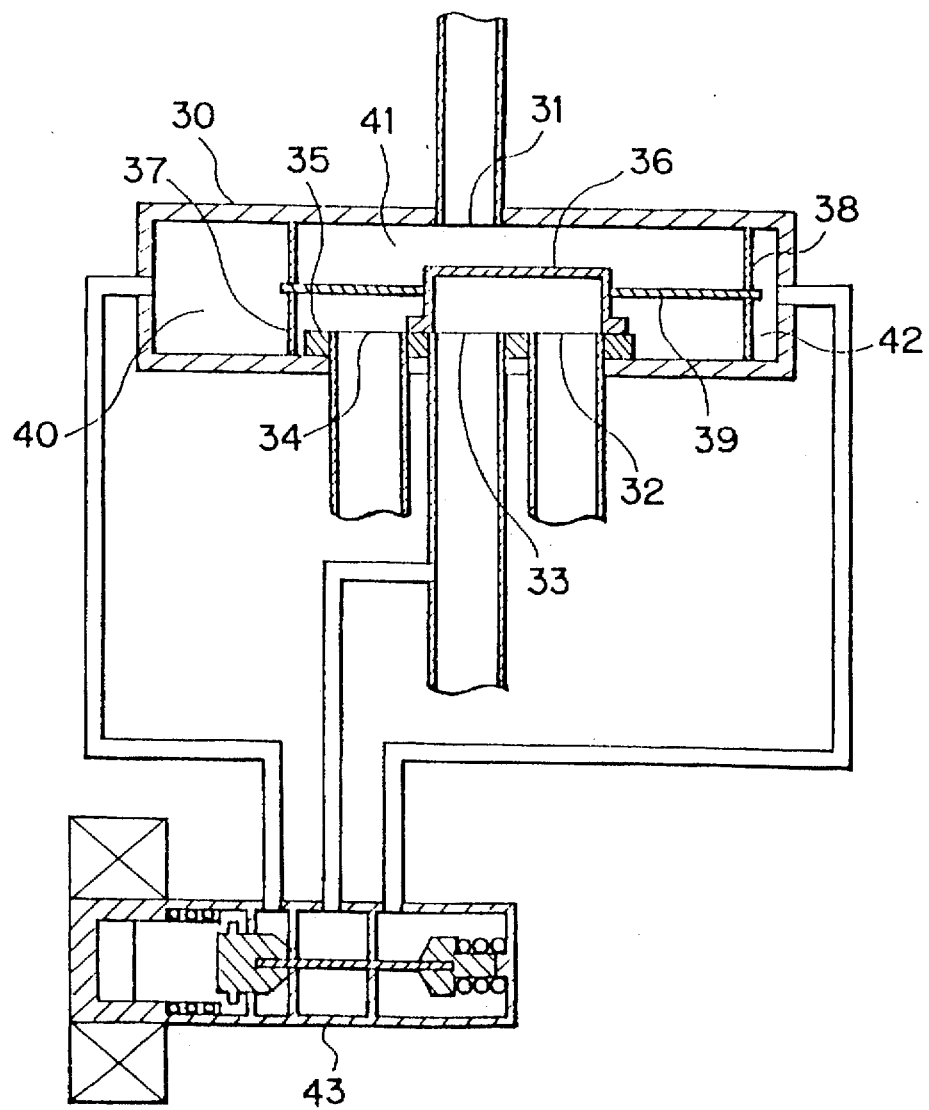
FIG. 1 is a longitudinal sectional side view of a general four-way change-over valve utilizing differences between refrigerant pressures.

FIG. 1 shows the construction of a four-way change-over valve used at present. As shown in FIG. 1, the change-over valve has a first piping hole 31 in a central upper portion of a cylindrical cylinder 30. The change-over valve also has a valve sheet 35 having a U-shape in cross section and arranged in a turning-over state in a central lower portion of the cylinder 30. The valve sheet 35 has three holes composed of a second piping hole 32, a third piping hole 33 and a fourth piping hole 34 arranged in series. A valve slide 36 having a bowl shape is arranged on an upper face of this valve sheet 35. A piston rod 39 has piston rings 37 and 38 on both sides of the valve sheet 35. The piston rod 39 is connected to the valve slide 36. Chambers 40, 41 and 42 within the cylindrical cylinder 30 are partitioned by the piston rings 37 and 38. Refrigerant pressures of the chambers 40 to 42 are switched by using an electromagnetic valve 43. Thus, the valve slide 36 is slid through the piston rod 39 so that cooling and heating operations of an air conditioner are switched. For example, such a switching system is shown in Japanese Patent Application Laying Open (KOKAI) No. 61-62677.

Japanese Utility Model Application Laying Open (KOKAI) No. 4-68264 shows another four-way change-over valve. In this change-over valve, a driving source is constructed by a wax type thermoelement having a shaft in a shaft core portion as a driving means of the valve slide 36. The driving source is also constructed by a heater arranged such that an outer circumferential portion of the wax type thermoelement is covered with the heater. A bracket is connected to the driving source. The valve slide is slid through the bracket. Japanese Patent Application Laying Open (KOKAI) No. 4-190058 also shows another four-way change-over valve. In this change-over valve, a screw shaft is moved by a stepping motor, a geared motor or a linear motor. The valve slide is slid through a bracket connected to an end tip of this screw shaft. A basic construction of each of bodies of these four-way change-over valves is similar to that shown in FIG. 1.

Figure 2:
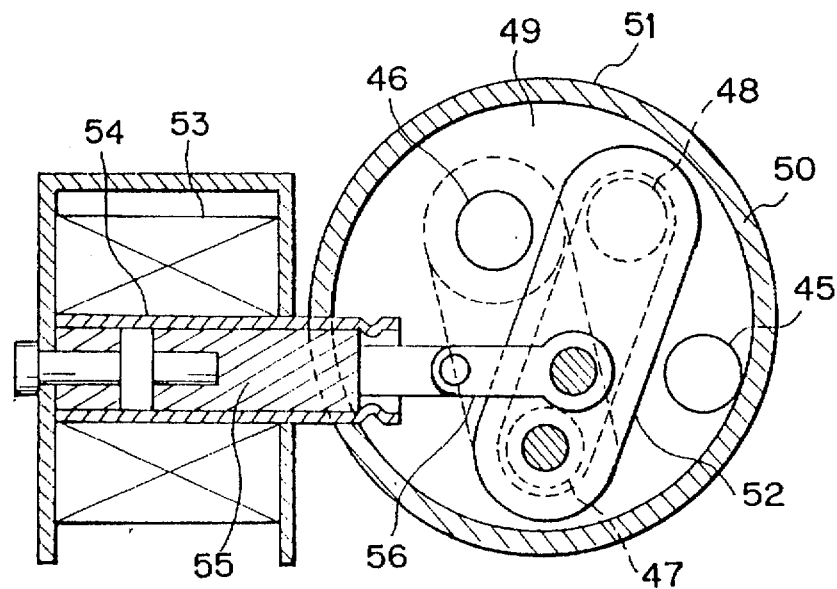
FIG. 2 is a cross-sectional plan view of a general four-way change-over valve utilizing a disk-shaped base and a valve body having a bowl shape.
Figure 3:
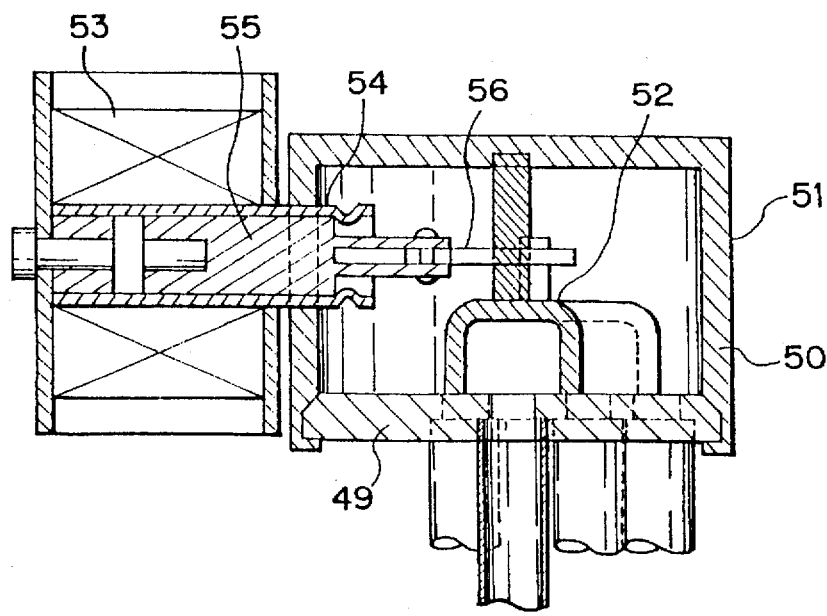
FIG. 3 is a longitudinal sectional side view of the four-way change-over valve shown in FIG. 2.

Each of FIGS. 2 and 3 shows an electromagnetic change-over valve applicable to an air conditioner. For example, such a valve is shown in Japanese Utility Model Application Laying Open (KOKAI) No. 58-127276. In this change-over valve, a device body 51 is constructed by a disk-shaped base 49 and a cylindrical body 50 having a bottom. The base 49 has a plurality of through holes such as four through holes 45, 46, 47 and 48. A valve body 52 is formed in an elliptical bowl shape to open and close the through holes. The valve body 52 is slidably arranged in a planar portion of the disk-shaped base 49 in the device body 51. This valve body 52 is moved by operating an electromagnetic coil 53 arranged outside the device body 51. A plunger 55 is arranged within a pipe-shaped guide 54 extending through an outer circumferential wall of the device body 51. Thus, one end portion of the valve body 52 is swung through an operating plate 56.

Japanese Patent Application Laying Open (KOKAI) No. 59-155669 shows a modified example of the change-over valve in which a valve body having a bowl shape is slid on the above-mentioned disk-shaped base.

In the above general structure of the four-way change-over valve utilizing a refrigerant pressure, the valve sheet 35 having a U-shape in cross section and the same curved surface as the cylinder must be accurately soldered to a central lower portion of the cylindrical cylinder 30. Further, this structure has a connecting means for connecting the valve slide 36 arranged on the upper face of the valve sheet 35 to the piston rod 39 or a bracket such that the valve slide 36 is set in a press contact state at any time and can be smoothly slid. This structure also has a fixing means for fixing the piston rings 37 and 38 to both ends of the piston rod 39. However, operability of each of the connecting and fixing means is greatly reduced since the valve slide 36 is located in a central portion of the cylinder 30.

In this structure, differences in pressure between the chambers 40 to 42 of the cylindrical cylinder are caused by using magnetomotive force as attractive force and resilient force of a spring as repulsive force in a switching operation of the change-over valve and one generation of the magnetomotive force and demagnetization. Thus, the valve slide is slid at all strokes. Accordingly, in a heating state of the air conditioner, no pressure differences between the chambers 40 to 42 for making a heating circuit can be held unless an electric current continuously flows through a solenoid. Therefore, no valve slide can be held in the heating state.

In the change-over valve using the wax type thermoelement, the pressures with the chambers are increased by heating the thermoelement in the driving source. Accordingly, an error in operation of the change-over valve tends to be caused, or a switching operation of the change-over valve tends to be unstable by the influence of an outside air temperature. Further, performance of the change-over valve is greatly influenced by a seal state between the shaft in the shaft core portion and the wax type thermoelement. However, it is very difficult to reliably seal the shaft and the wax type thermoelement when the change-over valve is manufactured. As a result, cost of the change-over valve is increased.

In the change-over valve using the stepping motor, etc., the stepping motor is very expensive so that cost of the four-way change-over valve is increased.

In each of the change-over valves shown in Japanese Utility Model Application Laying Open (KOKAI) No. 58-127276 and Japanese Patent Application Laying Open (KOKAI) No. 59-155669 mentioned above, the electromagnetic coil 53 is arranged outside the device body through the pipe-shaped guide 54. The plunger 55 is inserted into this guide 54 and the valve body 52 within the device body is swung through the operating plate 56. Therefore, the device body 52 is made compact, but the electromagnetic coil 53 is large-sized so that the electromagnetic coil 53 projects toward the exterior of the device body 52. Accordingly, the device body 52 and the electromagnetic coil 53 are unbalanced. Further, it is very troublesome to airtightly connect the device body 52 to the electromagnetic coil 53 through the guide 54. Accordingly, such a structure is not practically used.

Figure 4:
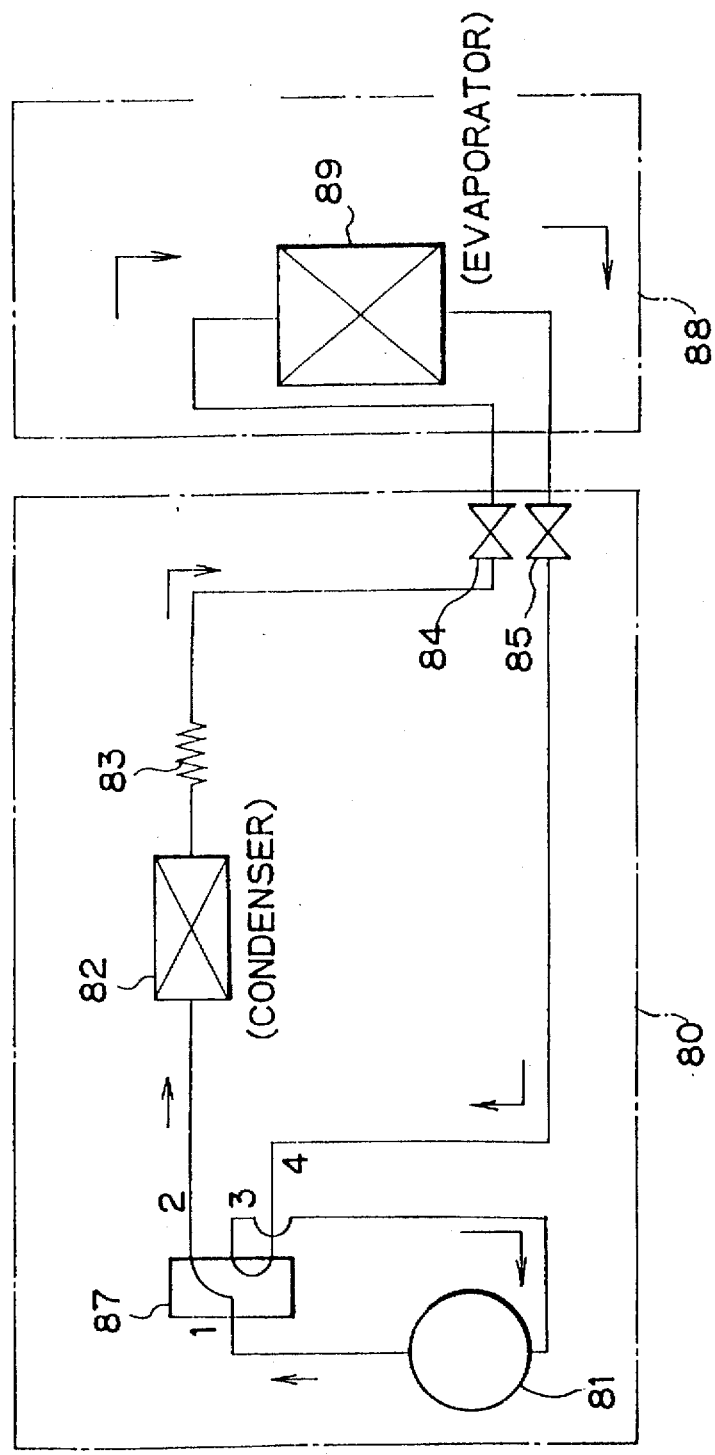
FIG. 4 is a refrigerant circuit diagram of a general air conditioner at a cooling time thereof.

FIG. 4 shows a general air conditioner of a separating type. In FIG. 4, a heat exchanger 82 is arranged on the side of an outdoor unit 80. A ¼" service valve 84 on a liquid side is arranged on one side of this heat exchanger 82 through a capillary tube 83. A four-way change-over valve 87, a compressor 81 and a ⅜" service valve 85 on a gas side are arranged on the other side of the heat exchanger 82. A first piping hole 1 and a third piping hole 3 of the four-way change-over valve 87 are connected to the compressor 81. A second piping hole 2 of the four-way change-over valve 87 is connected to the heat exchanger 82. A fourth piping hole 4 of the four-way change-over valve 87 is connected to the service valve 85 on the gas side. Both the service valves 84 and 85 are arranged and exposed outside the outdoor unit 80 and are connected to both end portions of a heat exchanger 89 on the side of an indoor unit 88.

A refrigerant flow is reversed by switching the four-way change-over valve 87 so that cooling and heating operations of the air conditioner are switched.

The four-way change-over valve 87 used in the general air conditioner shown in FIG. 4 is constructed as shown in FIG. 1.

Figure 5:
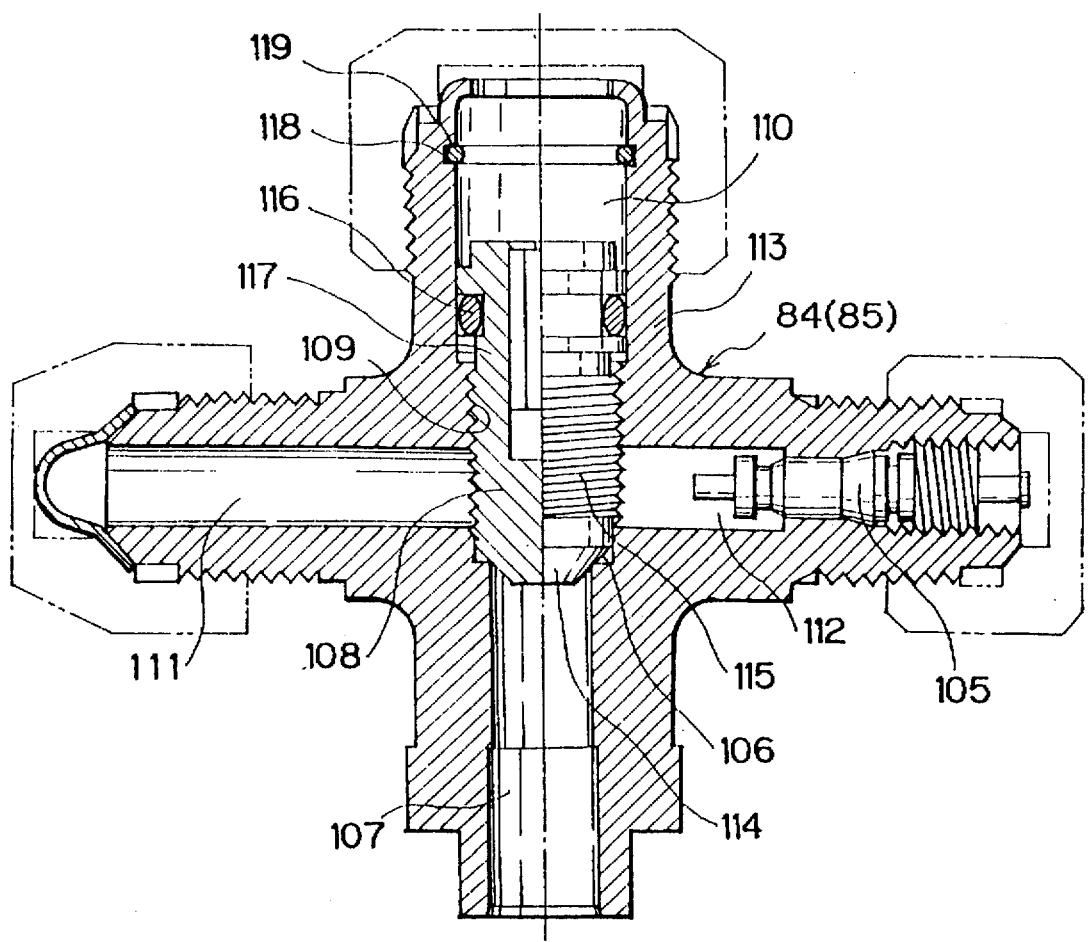
FIG. 5 is a longitudinal sectional side view of a general service valve.

As shown in FIG. 5, each of the service valve 84 on the liquid side and the service valve 85 on the gas side has a fluid introducing port 107 in a lower portion thereof. The fluid introducing port 107 has a valve seat 106 at an upper end thereof. A valve chest 108 is arranged above the valve seat 106. A female screw 109 is formed on an inner circumferential face of the valve chest 108. An upper opening 110 is formed above the valve chest 108. A fluid sending-out or discharging port 111 and a port 112 for a test are formed in upper side portions of the valve chest 108. A valve device body 113 has such constructional elements. A valve rod 117 is screwed into the valve chest 108 of the valve device body 113. The valve rod 117 has a valve body 114, a male screw 115 and an O-ring 116. The valve body 114 is arranged at a lower end of the valve rod 117. The male screw 115 is formed in a central body portion of the valve rod 117 and is screwed into the female screw 109. The O-ring 116 is arranged in an upper circumferential portion of the valve rod 117 and comes in press contact with an inner circumferential wall of the upper opening 110. A concave groove 118 is formed on the inner circumferential wall of the upper opening 110 above the valve rod 117. Further, an end ring 119 is arranged within this concave groove 118. An upper circumferential end edge of the upper opening 110 is caulked on an inner side thereof and a valve core 105 is mounted into the opening 112 for a test. For example, such a basic structure of the service valves is shown in Japanese Utility Model Application Laying Open (KOKAI) No. 4-43773.

In the above general structure using the two service valves 84 and 85 on the liquid and gas sides, the service valves each having the independent valve structure shown in FIG. 5 are manufactured so that cost of the change-over valve is increased. Further, a wide space for attaching the service valves is required. In this service valve structure, the respective openings 107, 110, 111 and 112 of the valve device body 113 are arranged on upper, lower and right-hand and right-hand sides of the valve device body 113. The valve rod 117 is arranged within the valve device body 113. Accordingly, the service valve structure is increased in height. Further, there are no opening and closing displays in the service valves so that no operator can accurately attach the service valves to an air conditioner unless the operator is a technical expert for attachment.

Figure 6:
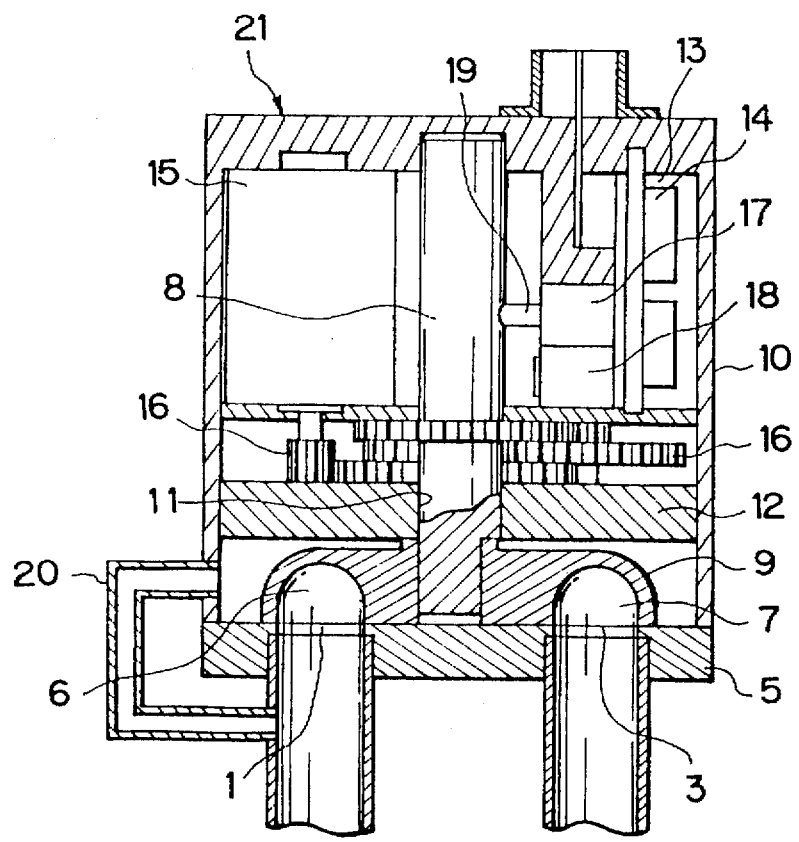
FIG. 6 is a longitudinal sectional side view of a four-way change-over valve in accordance with a first embodiment of the present invention.
Figure 7:
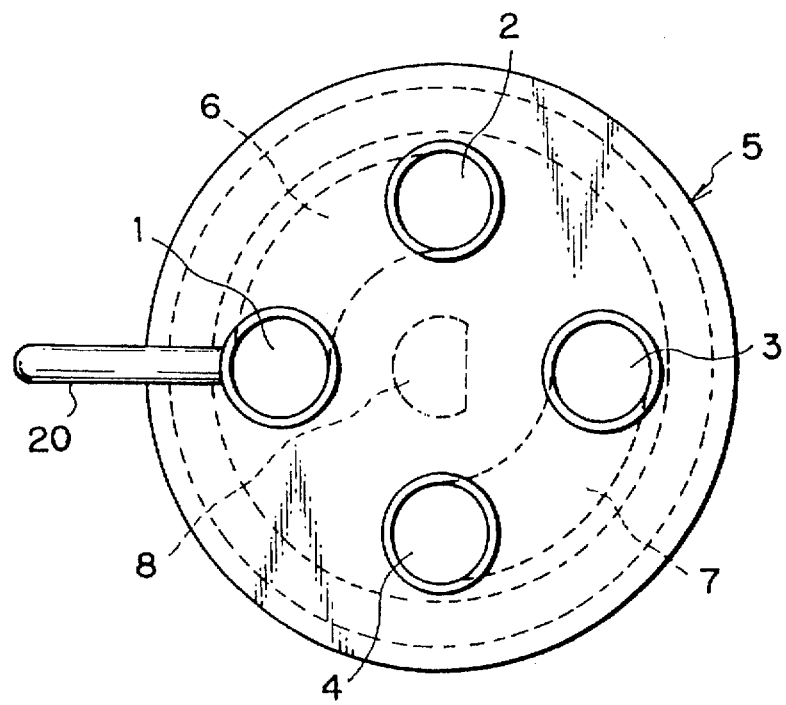
FIG. 7 is a bottom view of the four-way change-over valve shown in FIG. 6 at a cooling time of an air conditioner.

FIG. 6 is a longitudinal sectional side view of a four-way change-over valve in accordance with a first embodiment of the present invention. In FIG. 6, a valve seat 5 is formed in a thick disk shape. This valve seat 5 also constitutes a bottom wall as a portion of a valve case 10. As shown in FIG. 7, the valve seat 5 has first to fourth piping holes 1 to 4 in a planar portion thereof. The first to fourth piping holes 1 to 4 are arranged at an equal pitch on a concentric circle.

A rotary valve 9 is formed in a thick disk shape. This rotary valve 9 has a communicating groove 6 for connecting the first piping hole 1 to the second piping hole 2 and also has a communicating groove 7 for connecting the third piping hole 3 to the fourth piping hole 4. The communicating grooves 6 and 7 are symmetrically arranged on a lower face of the rotary valve 9. An operating shaft 8 is vertically arranged in a central upper portion of the rotary valve 9. The lower face of the rotary valve 9 comes in contact with an upper face of the above valve seat 5 so that the rotary valve 9 can be slidably rotated.

No two communicating holes 6 and 7 are necessarily formed in the rotary valve 9 having the thick disk shape. For example, a rotary valve having a thick sector shape and at least one communicating hole may be arranged such that this rotary valve can be rotated or swung.

A partition wall 12 having a shaft hole 11 in a central portion thereof is formed within a cylindrical valve case 10. A machine room 13 for arranging a drive unit is formed above this partition wall. This valve case 10 is airtightly fixed to the upper face of the valve seat 5 such that the rotary valve 9 is covered with the valve case 10 in a lower space of the partition wall 12 and the operating shaft 8 is inserted into the central shaft hole 11 and is projected to the machine room 13 located above.

A drive unit is assembled into the machine chamber 13 of the valve case 10. This drive unit rotates the operating shaft 8 of the rotary valve 9 through large and small gears at many stages by rotation of a compact DC motor 15 driven by a signal of an integrated circuit (IC) 14. In this drive unit, a lever 19 is perpendicularly projected to the operating shaft 8 and comes in contact with each of two microswitches 17 and 18 arranged in positions set at a rotational angle of 90°. Thus, the drive unit can rotate the operating shaft 8 by 90° in normal and reverse directions.

No motor 15 is necessarily rotated in the normal and reverse directions. For example, the motor 15 may be rotated every 90° in the same rotational direction. A driving means for rotating the rotary valve 9 is not limited to the compact DC motor 15, but may be constructed by another rotating means.

A communicating pipe 20 communicates the first piping hole 1 with a space below the partition wall 12 of the valve case 10. The first piping hole 1 is located on a high pressure side at any time when an air conditioner is operated. This high pressure is guided into the valve case 10 so that an upper portion of the rotary valve 9 is pressed against the valve seat 5 by this high pressure. Accordingly, sealing property of the valve seat and the rotary valve is improved so that cooling and heating abilities of the air conditioner are improved.

However, no communicating pipe 20 is necessarily required.

The four-way change-over valve 21 constructed above is operated as follows.

Figure 9A:
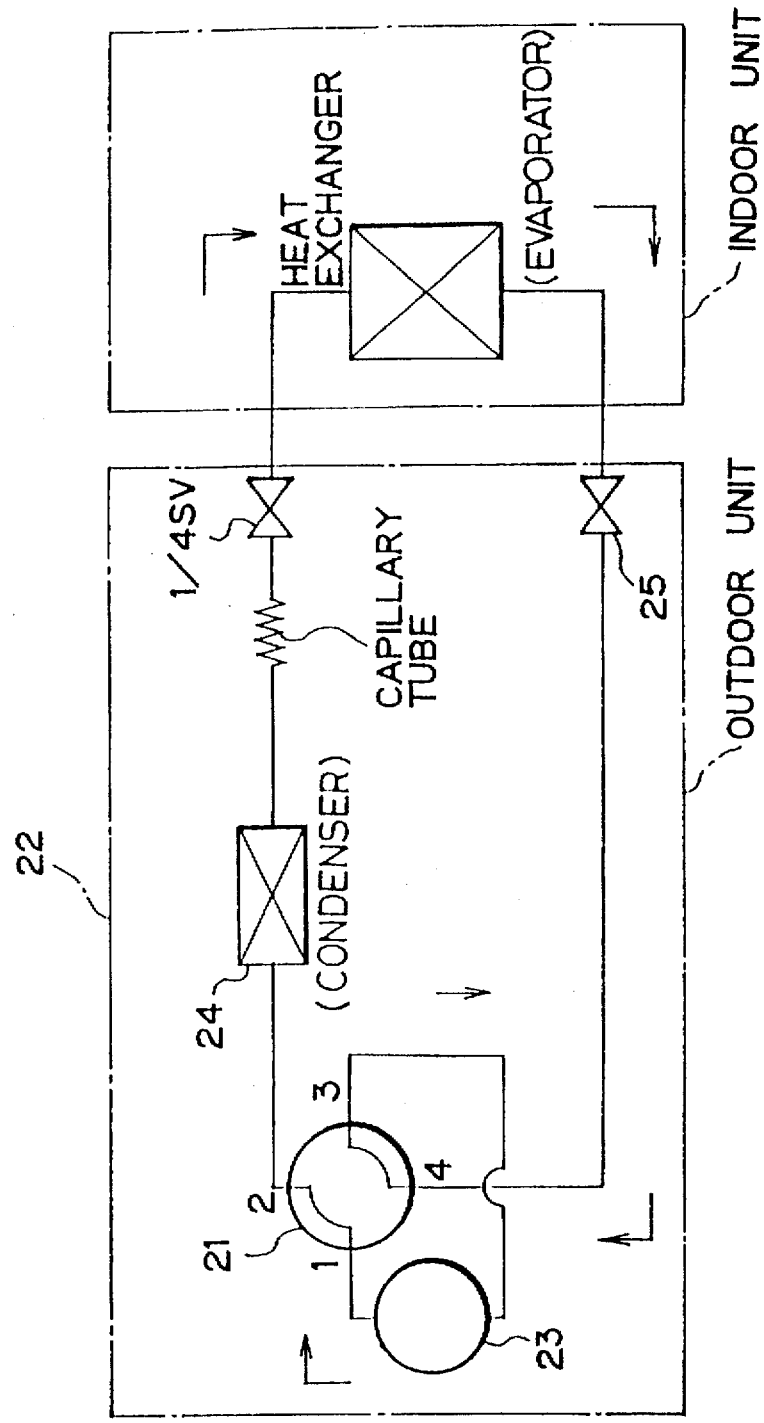
FIG. 9a is a circuit diagram of the air conditioner into which the four-way change-over valve in the present invention is assembled when a cooling operation is performed.
Figure 9B:
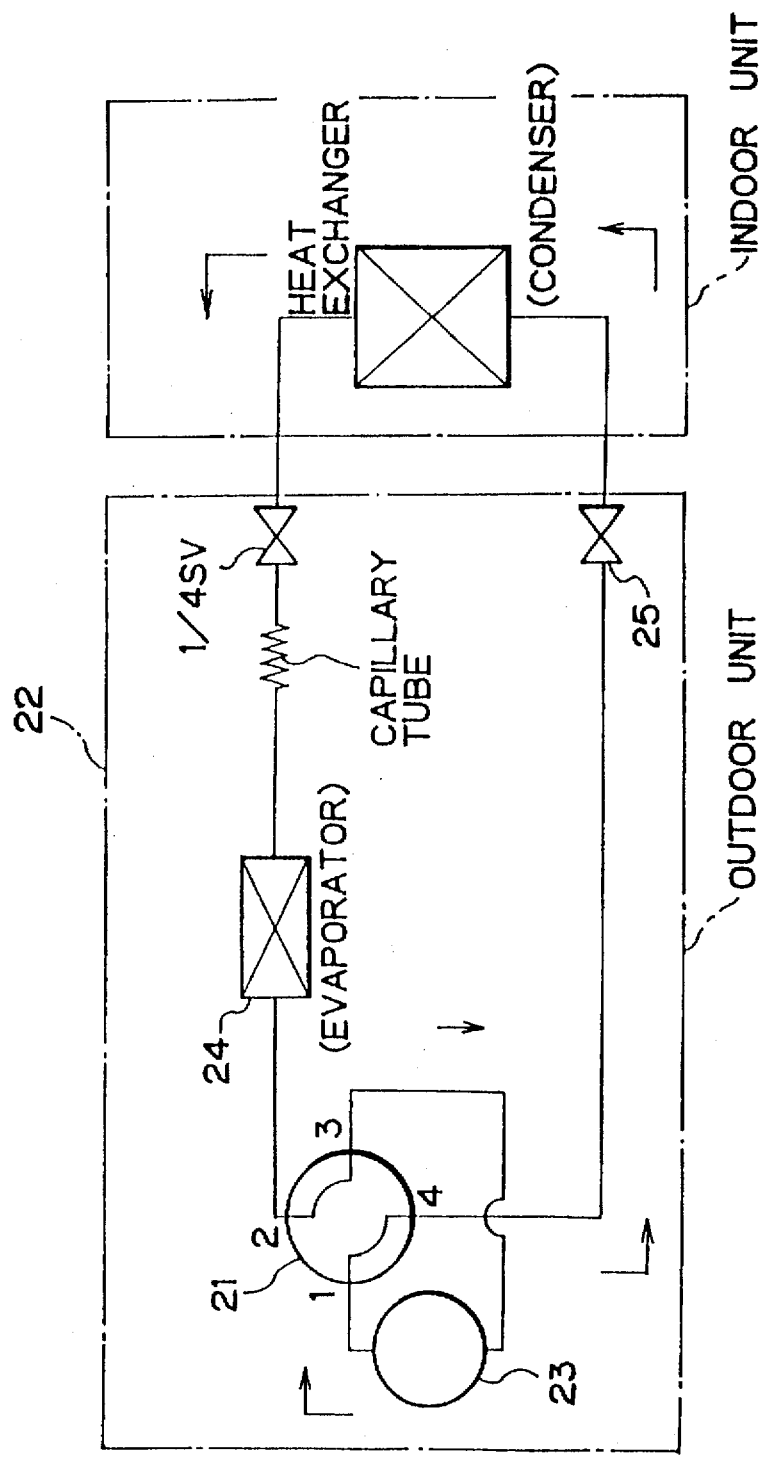
FIG. 9b is a circuit diagram of the air conditioner into which the four-way change-over valve in the present invention is assembled when a heating operation is performed.

As shown in FIGS. 9a and 9b, the four-way change-over valve 21 is arranged within an outdoor unit 22 of the air conditioner. The first piping hole 1 of the valve seat 5 is connected onto the outlet side of a compressor 23 through a pipe. The second piping hole 2 is connected to a heat exchanger 24 through a pipe. The third piping hole 3 is connected to an inlet side of the compressor 23 through a pipe. The fourth piping hole 4 is connected to a ⅜ service valve 25 through a pipe. This service valve 25 is connected to a heat exchanger of an indoor unit.

As shown in FIGS. 7 and 9a, when the first piping hole 1 and the second piping hole 2 are communicated with each other through the communicating groove 6 of the rotary valve 9 of the four-way change-over valve 21, the third piping hole 3 and the fourth piping hole 4 are simultaneously communicated with each other through the communicating groove 7. Accordingly, a cooling operation of the air conditioner is performed.

Figure 8:
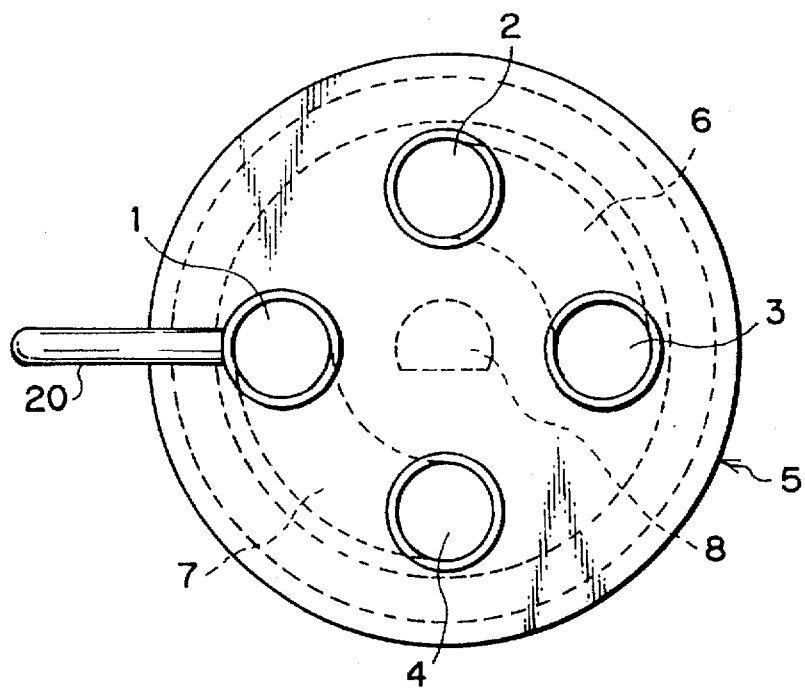
FIG. 8 is a bottom view of the four-way change-over valve shown in FIG. 6 at a heating time of the air conditioner.

When the rotary valve 9 is rotated 90° from the rotating state shown in FIGS. 7 and 9a, the rotary valve 9 attains a rotating state shown in FIGS. 8 and 9b. In this rotating state, the second piping hole 2 and the third piping hole 3 are communicated with each other through the communicating groove 6. Simultaneously, the first piping hole 1 and the fourth piping hole 4 are communicated with each other through the communicating groove 7. In this case, a heating operation of the air conditioner is performed.

As mentioned above, in accordance with a first structure of the present invention, a four-way change-over valve for an air conditioner comprises:

first to fourth piping holes 1 to 4 sequentially arranged on a concentric circle at a predetermined pitch in a planar portion of a valve seat 5 formed in a thick disk shape as one portion of a valve case 10; and a rotary valve 9 rotatably arranged on an upper face of this valve seat 5 and having at least one communicating groove 6 for independently connecting two adjacent piping holes of the four piping holes to each other;

cooling and heating operations of the air conditioner being switched by rotating the rotary valve 9.

In accordance with a second structure of the present invention, a driving source for rotating the rotary valve 9 is constructed by a compact DC motor 15.

In accordance with a third structure of the present invention, the first piping hole 1 is connected to the valve case 10 through a communicating pipe 20.

In accordance with a fourth structure of the present invention, a four-way change-over valve for an air conditioner comprises:

first to fourth piping holes 1 to 4 sequentially arranged on a concentric circle at an equal pitch in a planar portion of a valve seat 5 formed in a thick disk shape as one portion of a valve case 10; and a rotary valve 9 rotatably arranged on an upper face of this valve seat 5 and symmetrically having communicating grooves 6, 7 for independently connecting two adjacent piping holes of the four piping holes to each other;

cooling and heating operations of the air conditioner being switched by rotating the rotary valve 9.

In the present invention, the four-way change-over valve is constructed by the above simplified structure and the driving source is constructed by a compact DC motor. Accordingly, the piping holes connected to the valve seat can be easily processed and the four-way change-over valve can be easily assembled. Further, it is not necessary to arrange a complicated mechanism for utilizing differences between refrigerant pressures. Further, similar to the general change-over valve, the cooling and heating operations can be switched even in a high pressure difference state without projecting a bulky member such as an electromagnetic coil from the valve case. Further, it is not necessary to hold a current flowing state of a solenoid as in the general change-over valve in a heating state of the air conditioner.

Since the driving source is constructed by a compact DC motor and all driving and control means are built-in the valve case having the same diameter as the valve seat, the entire four-way change-over valve can be made compact and cheaply manufactured.

Figure 10:
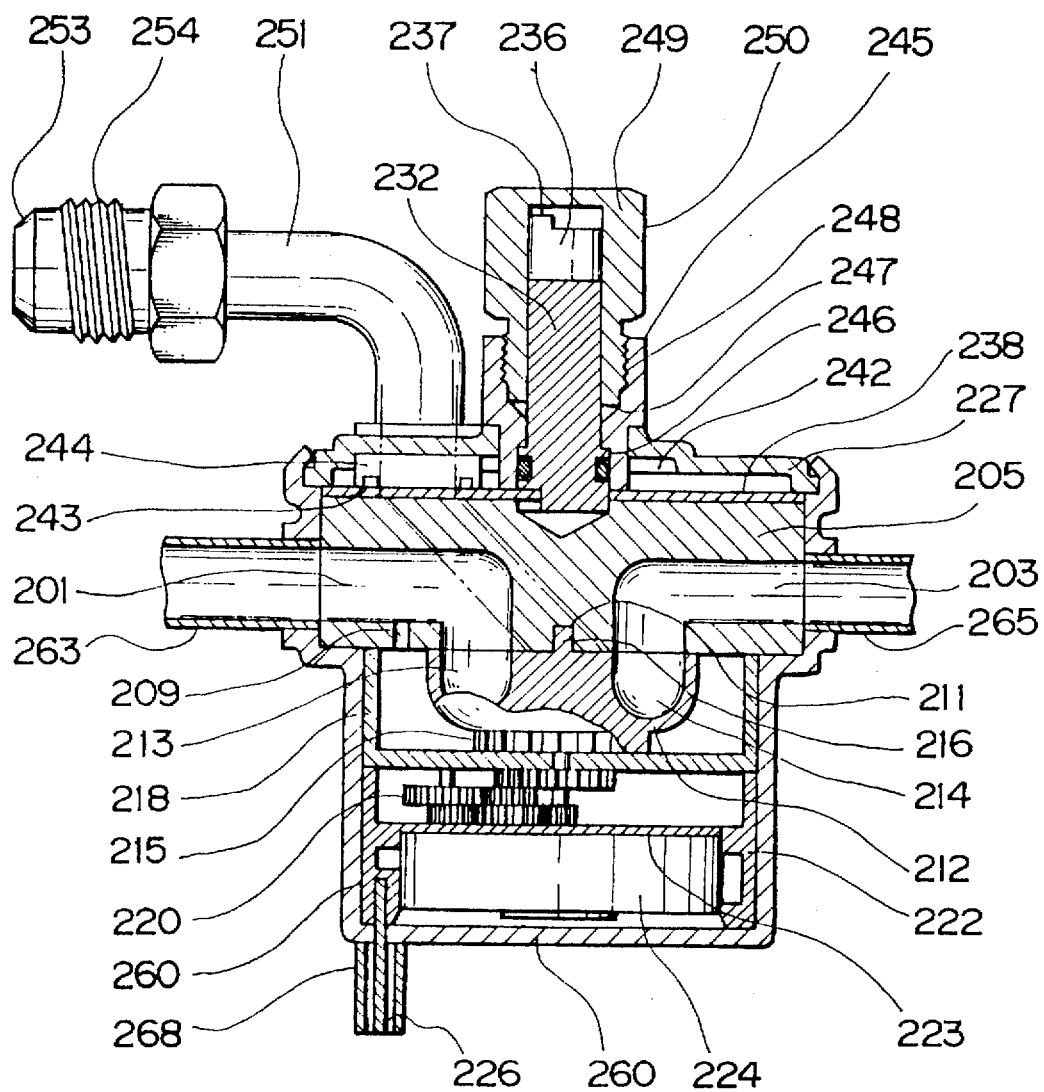
FIG. 10 is a longitudinal sectional side view showing one example of a service valve with a four-way change-over valve in accordance with a second embodiment of the present invention.

A service valve with a four-way change-over valve for an air conditioner in accordance with a second embodiment of the present invention will next be described with reference to FIGS. 10 and 11. In FIG. 10, a lower half section is a four-way change-over valve section and an upper half section is a service valve section. The construction of the four-way change-over valve will first be described.

A valve seat 205 is located in a central portion in FIG. 10 and is formed in a thick disk shape. The valve seat 205 has a circular recessed portion 206 having a shallow bottom on an upper face thereof (see FIG. 11). First to fourth piping holes 201 to 204 are formed on a concentric circle at an equal pitch on a lower face of this valve seat 205. Each of the first to third piping holes 201 to 203 is formed in an elbow shape connected to an outer circumferential side of the valve seat 205. The fourth piping hole 204 is communicated with a piping connection hole 207 formed on the upper face of the valve seat 5.

The piping connection hole 207 is located between the first piping hole 201 and the fourth piping hole 204 on the upper face of the valve seat 205 and is slantingly communicated with the fourth piping hole 204 on the lower face of the valve seat 205. A piping connection hole 208 is located between the first piping hole 201 and the second piping hole 202 and is formed in an elbow shape connected to the outer circumferential side of the valve seat 205. The piping connection holes 207 and 208 are arranged on a concentric circle. A communicating hole 209 is connected from an intermediate portion of the first piping hole 201 to the lower face of the valve seat 205. A fitting hole 210 is disposed in a central portion of the valve seat 205 on the upper face thereof. An end tip portion of a driving shaft 232 for rotating a disk shutter 227 described later is fitted into the fitting hole 210. A supporting hole 211 is disposed in a central portion of the valve seat 205 on the lower face thereof. A supporting shaft of a rotary valve 212 is fitted into the supporting hole 211.

The rotary valve 212 is formed in a thick disk shape and is located on the lower face of the valve seat 205. Communicating grooves 213 and 214 are symmetrically formed on an upper face of the rotary valve 212. The communicating groove 213 connects the first piping hole 201 and the second piping hole 202 of the valve seat 205 to each other. The communicating groove 214 connects the third piping hole 203 and the fourth piping hole 204 of the valve seat 205 to each other. A gear 215 having a ring shape is formed in a central lower portion of the rotary valve 212. A pin 216 is formed in a central portion of the rotary valve 212 on the upper face thereof. The pin 216 is fitted into the supporting hole 211 on the lower face of the valve seat 205. A rotary restricting portion 217 is disposed in an outer circumferential portion of the rotary valve 212.

A valve case 218 is formed in a cylindrical shape having a bottom. A rotary restricting projection 219 is formed on an inner circumferential face of this valve case 218. A plurality of holes 221b are formed in a bottom wall of the valve case 218. Shafts of plural gears 220 described later are respectively fitted into these holes 221b. The rotary valve 212 is covered with the valve case 218.

A cylindrical bracket 222 has a partition plate 223 in an intermediate portion thereof. A plurality of holes 221 are formed in this partition plate 223. The above shafts of the gears 220 are respectively fitted into these holes 221. The bracket 222 is arranged below the valve case 218 such that the bracket 222 and the valve case 218 overlap each other.

A compact motor 224 is arranged below this bracket 222. A gear shaft 225 is attached to a shaft of the motor 224 and is projected upward from the partition plate 223. The above plural gears 220 are combined with each other between the partition plate 223 and the bottom wall of the valve case 218. The rotary valve 212 is rotated at a low speed through the ring-shaped gear 215 on a lower face of the rotary valve 212.

Reference numeral 226 designates a terminal of the compact motor 224.

The construction of the service valve section in the upper half section of FIG. 10 will next be described.

A disk shutter 227 is rotatably fitted into the circular recessed portion 206 on the upper face of the valve seat 205. The disk shutter 227 has passing holes 228 and 229 in positions corresponding to the piping connection holes 207 and 208 of the valve seat 205. The disk shutter 227 also has a driving hole 230 in a central portion thereof. No driving hole 230 is formed in a circular shape. No shape of the driving hole 230 is especially limited. Accordingly, the driving hole 230 may be formed in the shape of a notch partially having a straight line portion 231 and a circular portion as shown in FIG. 11.

A driving shaft 232 is arranged to rotate the disk shutter 227. A slotted portion 233 is formed at a lower end of the driving shaft 232 such that the slotted portion 233 is inserted into the driving hole 230. The driving shaft 232 has a ring groove 235 in an intermediate portion thereof and an O-ring 234 is fitted to this ring groove 235. A driver groove 236 and a stepped directional mark 237 are formed at an upper end of the driving shaft 232.

A shutter cover 238 is arranged on the upper face of the valve seat 205 such that the disk shutter 227 is covered with the shutter cover 238. Piping holes 239 and 240 are formed in positions of the shutter cover 238 corresponding to the piping connection holes 207 and 208 of the valve seat 205. A through hole 241 is formed in a central portion of the shutter cover 238.

The piping holes 239, 240 and the central through hole 241 are formed by press working in a state in which a space 242 is formed on the lower face of a peripheral portion around these holes. A washer 244 having a ring shape has an O-ring 243 on a lower face thereof and is integrally formed in the space 242 on lower faces of the piping holes 239 and 240.

A driving shaft guide 245 is fixed to the through hole 241. The driving shaft guide 245 has an enlarged hole 246 at an internal lower end thereof. The above O-ring 234 is airtightly fitted into this enlarged hole 246. The driving shaft guide 245 is enlarged in an upper half portion thereof through a tapered face 247. The driving shaft guide 245 has a female screw 248 in an inner circumferential portion thereof.

A screw cap 249 has a hexagon head 250 which can be screwed into the female screw 248 of the driving shaft guide 245. A lower end portion of the screw cap 249 comes in press contact with the above tapered face 247 so that a metallic seal is formed.

A connection pipe 251 is connected to the piping hole 239 of the shutter cover 238. The connection pipe 251 has a service port portion 252 in an intermediate portion thereof. The service port portion 252 has an unillustrated valve core. The connection pipe 251 also has a flare face 253 and a male screw 254 at an end tip thereof. A connection pipe 255 is similarly connected to the piping hole 240. This connection pipe 255 also has a flare face 256 and a male screw 257 at an end tip thereof. A flare nut is normally screwed to the end tip of each of both the connection pipes 251 and 255.

A body case 260 is formed in a cylindrical shape having a bottom. A lower half portion 261 of this body case 260 has a diameter set such that the valve case 218 and the bracket 222 are fitted into this lower half portion 261. An upper half portion 262 of the body case 260 has a diameter set to be slightly larger than that of the lower half portion 261 such that the valve seat 205 is fitted into this upper half portion 262. Pipes 263 to 266 are radially arranged in an outer circumferential portion of the upper half portion 262. These pipes 263 to 266 are located in positions corresponding to the first to third piping holes 201 to 203 and the piping connection hole 208 directed to an outer circumferential portion of the valve seat 205 having a thick disk shape. These pipes 263 to 266 are respectively communicated with the first to third piping holes 201 to 203 and the piping connection hole 208. A terminal hole 267 of the compact motor 224 is formed in a bottom portion of the body case 260. The projected terminal 226 of the motor is covered with a cover 268.

The above service valve with the four-way change-over valve in the second embodiment of the present invention is assembled in the following order.

First, the compact motor 224 is fixed to a lower portion of the partition plate 223 of the bracket 222. The plural gears 220 are engaged with each other in an upper portion of the partition plate 223. The rotary valve 212 is inserted into the valve case 218. This valve case 218 is mounted onto the engaged gears 220. The gears 220 and the ring-shaped gear 215 on the lower face of the rotary valve 212 are combined with each other such that rotation of the compact motor 224 is transmitted to the ring-shaped gear 215 through the gears 220 in a speed reducing state. The terminal 228 of the compact motor 224 is then inserted into the terminal hole 267 in the body case bottom portion. The above combined members are fitted into the lower half portion 261 of the body case 260.

Next, the pin 216 on the upper face of the rotary valve 212 is fitted into the supporting hole 211 at a central lower end of the valve seat 205 having a thick disk shape. The piping holes in an outer circumferential portion of the valve seat 205 are aligned and connected to respective pipes of the body case 260. Then, the disk shutter 227 is fitted into the circular recessed portion 206 on the upper face of the valve seat 205.

A lower end of the driving shaft 232 is fitted into the driving hole 230 in a central portion of the disk shutter 227. Thereafter, the connection pipes 251, 255 and the driving shaft guide 245 are attached to the shutter cover 238 in advance. The driving shaft 232 is inserted into a central portion of the driving shaft guide 245 attached to the shutter cover 238 in advance. An upper face of the disk shutter 227 is covered with this shutter cover 238. An opening portion of the body case 260 at an upper end thereof is then caulked inside the body case 260 so that the shutter cover 238 is fixed.

Figure 11:
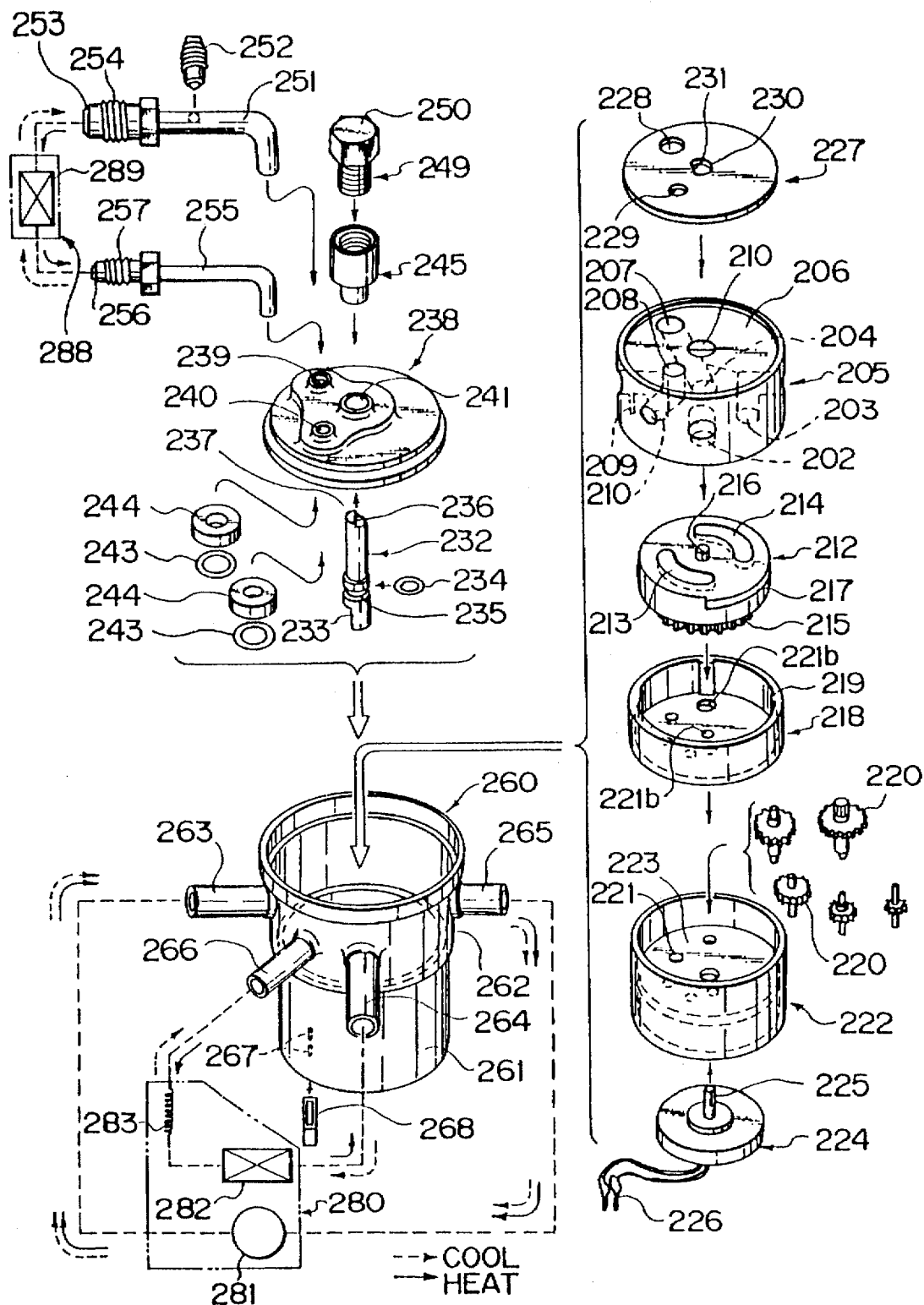
FIG. 11 is an exploded perspective view showing the service valve with the four-way change-over valve in the second embodiment of the present invention.
Figure 15:
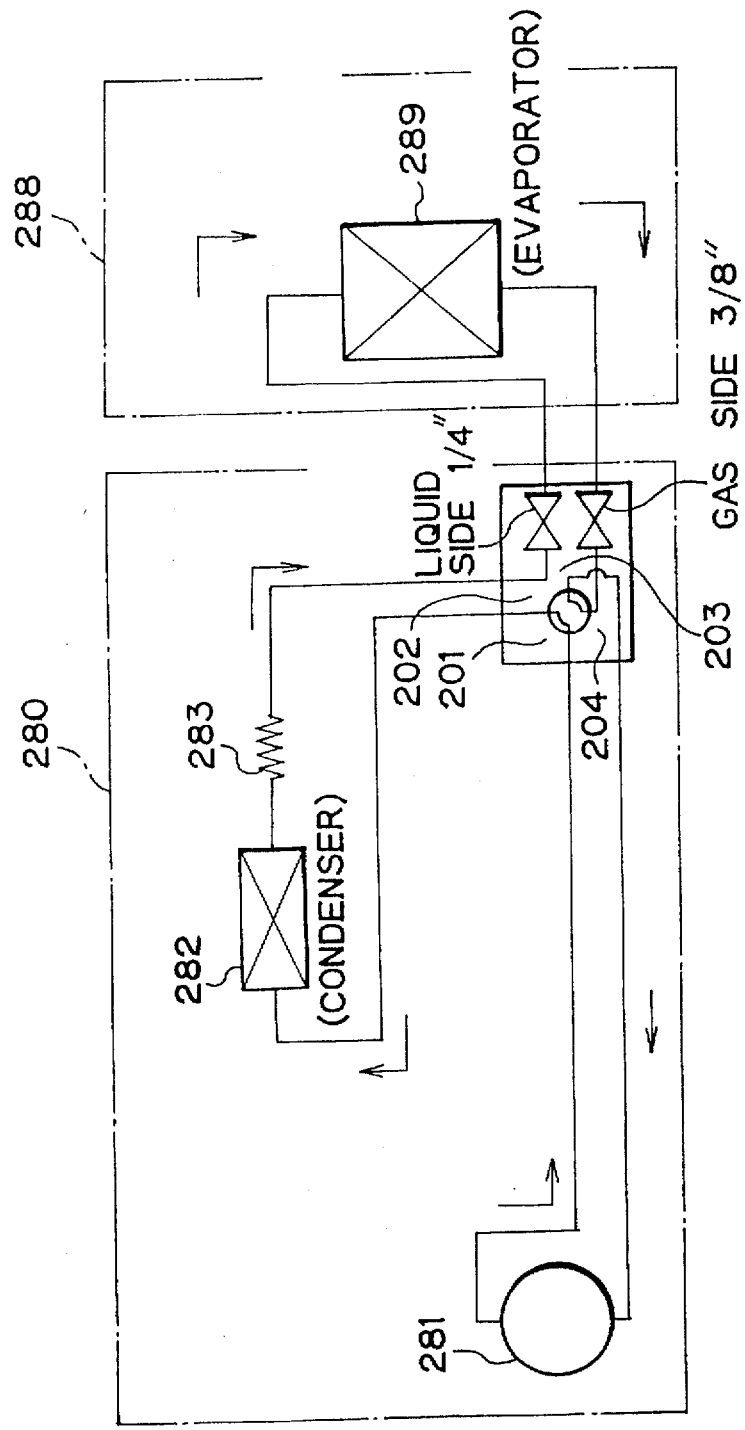
FIG. 15 is a refrigerant circuit diagram of an air conditioner into which the service valve with the four-way change-over valve in the present invention is assembled at a cooling time of the air conditioner.

The service valve with the four-way change-over valve in the present invention is arranged in an outdoor unit 280 of an air conditioner as shown in FIGS. 11 and 15.

Namely, an opening of the first piping hole 201 in a valve seat side portion thereof is connected to the outlet side of a compressor 281 through a pipe 263 of the body case 260. Similarly, an opening of the third piping hole 203 in a valve seat side portion thereof is connected to an inlet side of the compressor 281 through a pipe 265. An opening of the second piping hole 202 in a valve seat side portion thereof is connected to a heat exchanger 282 on a side of the outdoor unit 280 through a pipe 264. An opening of the piping connection hole 208 on a liquid side in a valve seat side portion thereof is connected to a capillary tube 283 through a pipe 266.

The connection pipe 251 on the gas side connected to the piping connection hole 207 of the service valve section is connected to a heat exchanger 289 of an indoor unit 288. The connection pipe 255 connected to the piping connection hole 208 on the liquid side is also connected to the heat exchanger 289 of the indoor unit 288.

The service valve with the four-way change-over valve is operated as follows.

The driving shaft 232 of the service valve with the four-way change-over valve is operated by a driver to rotate the disk shutter 227 so that the passing holes 228 and 229 of the disk shutter 227 are respectively communicated with the piping connection holes 207 and 208 of the valve seat 205 as shown in FIG. 11. In this communicating state, the air conditioner attains an operable state. When the first piping hole 201 is then communicated with the second piping hole 202 through the communicating groove 213 of the rotary valve 212, the third piping hole 203 is simultaneously communicated with the fourth piping hole 204 through the communicating groove 214. Accordingly, a cooling operation of the air conditioner is performed as shown in FIG. 15.

From this cooling state, the rotary valve 212 is rotated 90° so that the second and third piping holes 202 and 203 are communicated with each other through the communicating groove 213. Simultaneously, the first and fourth piping holes 201 and 204 are communicated with each other through the communicating groove 214. Thus, the cooling operation of the air conditioner is switched to a heating operation thereof.

If no passing holes 228 and 229 of the disk shutter 227 are set to be aligned with any one of the piping connection holes 207 and 208 of the valve seat 205 at forwarding and moving times of the air conditioner, it is possible to freely detach and move the air conditioner since the passing holes on the gas and liquid sides are closed.

When an air purging state of the air conditioner is set, the passing hole 228 of the disk shutter 227 is aligned with the piping connection hole 208 on the liquid side. In this state, air stored within piping of the indoor unit is pushed out by refrigerant within the outdoor unit so that this air is discharged into the air by pushing the valve core within the service port portion 252. Thus, the indoor unit is also filled with the refrigerant.

When a pumping-down state of the air conditioner is set, the passing hole 229 of the disk shutter 227 is aligned with the piping connection hole 207 on the gas side, and the piping connection hole 208 on the liquid side is closed. In this state, when the air conditioner is operated, the refrigerant on the indoor unit side is sucked and returned to the outdoor unit side by the compressor.

A position of the disk shutter 227 and opening and closing states of the holes on the liquid and gas sides in this disk shutter position can be visualized by a display on an upper face of the shutter cover 238 shown in FIG. 11 and the directional mark 237 of the driving shaft 232. In an operation of the driving shaft 232, the driving shaft 232 is rotated in a state in which the hexagon head 250 of the screw cap 249 is unfastened and detached by a spanner. When the air conditioner is forwarded, moved and operated, this screw cap 249 is screwed into the female screw 248 of the driving shaft guide 245. Thus, a metallic touch seal is formed between a lower end portion of the screw cap 249 and the tapered face 247 within the driving shaft guide 245.

In rotation of the rotary valve 212, the outer circumferential restricting portion 217 of this rotary valve 212 comes in contact with the restricting projection 219 in an inner circumferential portion of the valve case 218 so that the rotary valve 212 is stopped in a predetermined position.

FIGS. 10 and 11 show one preferred embodiment of the service valve with the four-way change-over valve in the present invention. Accordingly, the structure of each of constructional portions of the service valve can be suitably changed.

For example, in FIGS. 10 and 11, the body case 260 and the shutter cover 238 are formed by press working, but can be also formed by casing and forging. In this case, connection pipe portions can be integrated with each other.

The first to fourth piping holes 201 to 204 on the lower face of the valve seat 205 are arranged on a concentric circle at an equal pitch. This pitch is determined by the relation in shape between the communicating grooves 213 and 214 of the rotary valve 212 and a rotating amount of the rotary valve 212. Accordingly, the first to fourth piping holes 201 to 204 can be arranged at pitches except for the equal pitch.

Only one of the communicating grooves 213 and 214 may be formed and arranged. In this case, for example, it is sufficient to form the rotary valve 212 in a sector shape such that two piping holes are communicated with each other through this one communicating groove and the piping holes except for these two piping holes are set to be opened.

The distances between the piping connection holes 207 and 208 on the upper face of the valve seat 205 and the passing holes 228 and 229 of the disk shutter 227 are set such that operable, all hole closing, air purging and pumping-down operations of the air conditioner are performed in four rotational positions of the disk shutter 227 every 90°. However, required operations of the air conditioner may be performed in three rotational positions of the disk shutter 227 every 120° in the case of the air conditioner of a type in which no air purging operation is performed.

When a strainer is attached to the air conditioner, the strainer may be attached into the piping connection holes 207, 208, the connection pipes 251, 255, or the pipes 265, 266 of the body case 260.

No metallic touch seal means of the screw cap 249 is necessarily required. Further, no driving means of the disk shutter 227 is also especially required.

No reduction gear means for reducing a rotational speed of the compact motor 224 is limited to plural gears.

A service valve with a four-way change-over valve for an air conditioner in accordance with a third embodiment of the present invention will next be described with reference to FIGS. 12 to 14. This service valve in the third embodiment is different from that in the second embodiment shown in FIGS. 10 and 11 with respect to the constructions of a valve seat and a rotary valve. The other constructional portions are similar to those in the second embodiment. Accordingly, the same constructional portions as the second embodiment are designated by the same reference numerals and an explanation thereof is omitted in the following description.

Figure 12:
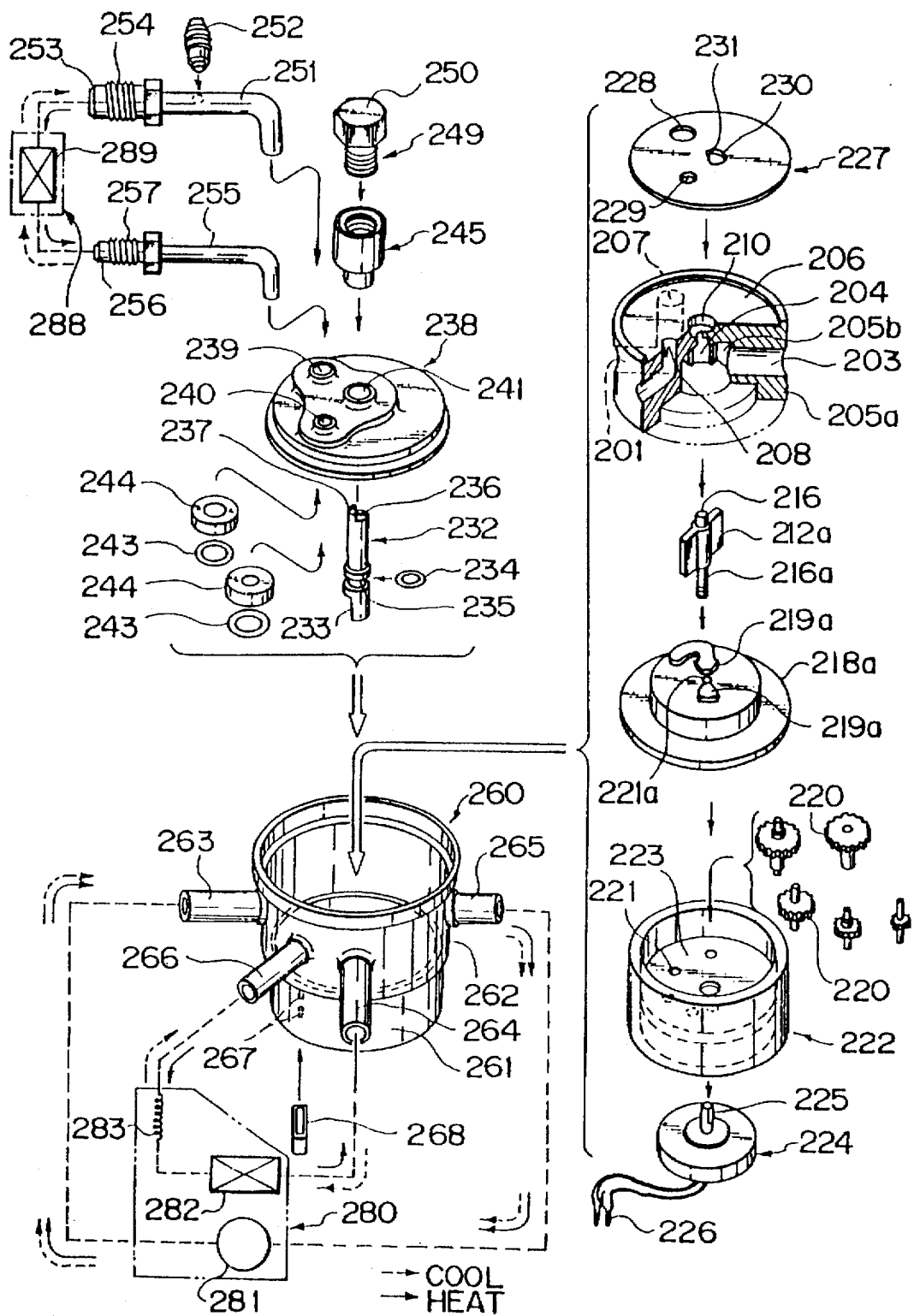
FIG. 12 is an exploded perspective view showing a service valve with a four-way change-over valve in accordance with a third embodiment of the present invention.

A valve seat 205a is located in a central portion of the service valve shown in FIG. 12. The valve seat 205a has a thick disk shape in which a circular recessed portion 206 having a shallow bottom is formed on an upper face of the valve seat 205a. A valve chest 205b is formed in a central portion of the valve seat 205a. First to fourth piping holes 201 to 204 are formed in an outer circumferential portion of the valve seat 205a and are sequentially arranged at an equal pitch in four directions. Each of the first to third piping holes 201 to 203 is formed in the shape of a straight line connected to an outer circumferential side face of the valve seat 205a. The fourth piping hole 204 is communicated with a piping connection hole 207 formed on the upper face of the valve seat 205a and described later.

The valve seat 205a has sector chambers stepped on a plane and symmetrically arranged. Rotation of a rotary valve 212a formed in a butterfly shape and described later is restricted by a stepped portion of the valve seat 205a.

Piping connection holes 207 and 208 are formed on a concentric circle on the upper face of the valve seat 205a. The piping connection hole 207 is arranged on a side of the fourth piping hole 204 over the first piping hole 201 and is communicated with the fourth piping hole 204 (see FIG. 13). The piping connection hole 208 is formed in an elbow shape on a side of the second piping hole 202 and is connected to an outer circumferential side face of the valve seat 205a.

The rotary valve 212a in a butterfly shape is located in a central portion of the valve seat 205a. An outer circumferential surface of the rotary valve 212a is coated with rubber. The rotary valve 212a has a pin 216 in an upper portion thereof. The rotary valve 212a also has a gear shaft 216a in a lower portion thereof.

A valve seat cover 218a is formed in a disk shape and is located on a lower face of the valve seat 205a. A rotary restricting projection 219a is formed on an upper face of the valve seat cover 218a and is located in a position corresponding to a step of the sector chambers of the valve seat 205a. A hole 221a is formed in a central portion of the valve seat cover 218a. The gear shaft 216a formed in the lower portion of the rotary valve 212a is fitted into this hole 221a. The valve chest 205b is formed by this valve seat cover 218a and the valve seat 205a.

In this third embodiment, the rotary valve 212a is formed in a butterfly shape. However, for example, the rotary valve may be formed in a columnar shape.

Namely, when the valve chest 205b in the central portion of the valve seat 205a is formed in a cylindrical shape, the rotary valve may be rotatably formed in a columnar shape within this valve chest 205b such that each of communicating grooves independently connects two adjacent piping holes of the first to fourth piping holes to each other and is symmetrically arranged in the rotary valve.

The above-mentioned service valve is assembled in the following order.

Figure 13:
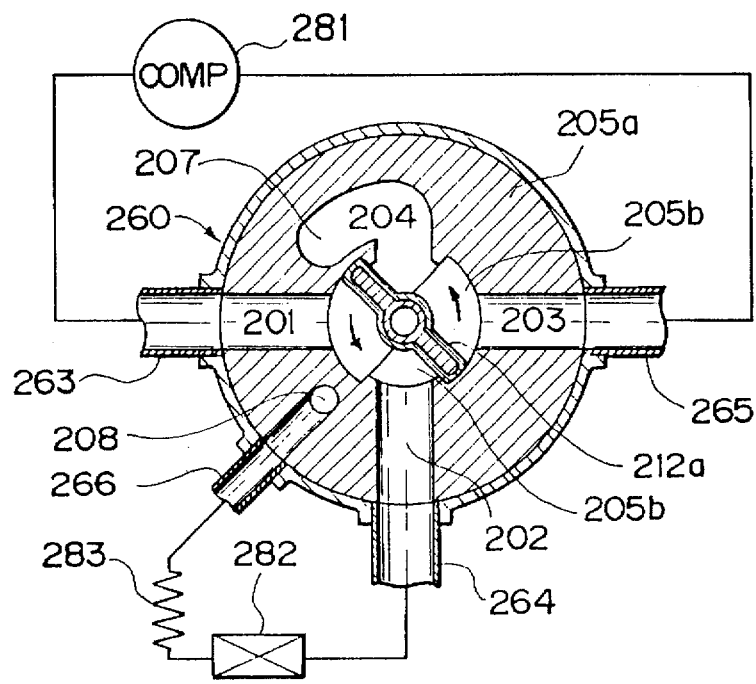
FIG. 13 is a central cross-sectional plan view showing an assembly state of the service valve with the four-way change-over valve shown in FIG. 12.
Figure 14:
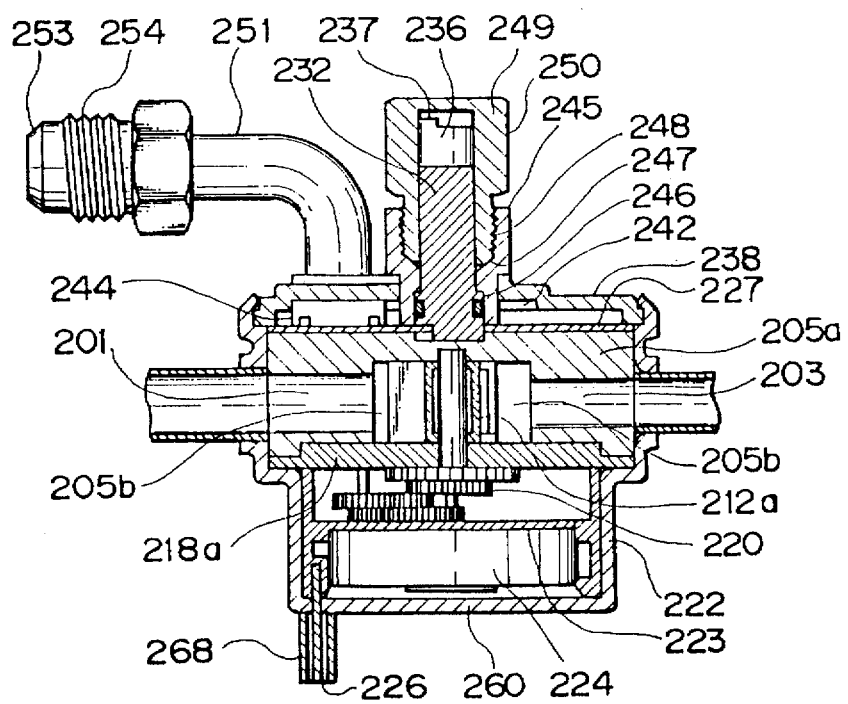
FIG. 14 is a longitudinal sectional side view showing an assembly state of the service valve with the four-way change-over valve shown in FIG. 12.

As shown in FIGS. 13 and 14, the rotary valve 212a is mounted into the valve chest 205b in the central portion of the valve seat 205a. The valve seat 205a and the rotary valve 212a are covered with the valve seat cover 218a from below. The rotary valve 212a is rotatably held in a state in which the gear shaft 216a in a lower portion of the rotary valve 212a is projected downward from the hole 221a of the valve seat cover 218a.

Next, the gear shaft 216a is engaged with a lowest speed gear of plural gears 220 within a bracket 222 explained in the second embodiment. In this engaging state, as shown in FIG. 14, the bracket 222 and the valve seat 205a are mounted into a body case 260.

An assembly order of the other constructional portions is similar to that in the second embodiment. Accordingly, an explanation of this assembly order is omitted in the following description. Further, an operation of this service valve is also similar to that in the second embodiment except for the difference in structure of the rotary valve. Accordingly, an explanation of this operation is also omitted in the following description.

As mentioned above, in accordance with a fifth structure of the present invention, a service valve with a four-way change-over valve for an air conditioner is characterized in that both service valves on liquid and gas sides of a refrigerant circuit are integrated with each other and are further integrated with the four-way change-over valve as one valve unit with one valve seat as a common valve seat.

In accordance with a sixth structure of the present invention, a service valve with a four-way change-over valve for an air conditioner comprises:

first to fourth piping holes 201 to 204 formed on a lower face of a valve seat 205 having a thick disk shape and sequentially arranged on a concentric circle at a predetermined pitch;

three piping holes among the four piping holes 201 to 204 being communicated with a side portion of the valve seat; and a rotary valve 212 rotatably arranged on the lower face of the valve seat 205 and having one or two communicating grooves 213, 214 independently connecting two adjacent piping holes of the four piping holes 201 to 204 to each other and symmetrically arranged;

cooling and heating operations of the air conditioner being switched by rotating the rotary valve 212;

the service valve further comprising:

two piping connection holes 207, 208 formed on an upper face of the valve seat 205 such that the two piping connection holes 207, 208 are shifted from each other on a concentric circle;

one of the two piping connection holes 207, 208 being connected to a piping hole except for the three piping holes communicated with the side portion on the lower face of the valve seat;

the other piping connection hole being communicated with the side portion of the valve seat;

a disk shutter 227 rotatably arranged on the upper face of the valve seat 205 and having two passing holes 228, 229 in positions corresponding to the piping connection holes 207, 208; and a shutter cover 238 arranged above the disk shutter 227 and having piping holes 239, 240 in positions corresponding to the two passing holes 228, 229 of the disk shutter 227;

cooling and heating operable states of the air conditioner and an operating state of the air conditioner except for the cooling and heating operable states being switched by rotating the disk shutter 227.

In accordance with a seventh structure of the present invention, a strainer is attached into each of the piping connection holes 207, 208.

In accordance with an eighth structure of the present invention, driving means for rotating the rotary valve 212 is constructed by a compact motor 224.

In accordance with a ninth structure of the present invention, a service valve with a four-way change-over valve for an air conditioner comprises:

a valve chest 205b formed in a central portion of a valve seat 205a having a thick disk shape;

first to fourth piping holes 201 to 204 each formed in an outer circumferential portion of the valve chest 205b and sequentially arranged at a predetermined pitch in four directions;

three piping holes of the four piping holes 201 to 204 being communicated wit a side portion of the valve seat 205a; and a rotary valve 212a rotatably arranged within the valve chest 205b in the central portion of the valve seat and independently connecting two adjacent piping holes among the four piping holes 201 to 204 to each other;

cooling and heating operations of the air conditioner being switched by rotating the rotary valve 212a;

the service valve further comprising:

two piping connection holes 207, 208 formed on an upper face of the valve seat 205a such that the two piping connection holes 207, 208 are shifted from each other on a concentric circle;

one of the two piping connection holes 207, 208 being connected to a piping hole except for the three piping holes communicated with the side portion of the valve seat;

the other piping connection hole being communicated with the side portion of the valve seat;

a disk shutter 227 rotatably arranged on the upper face of the valve seat 205a and having passing holes 228, 229 in positions corresponding to the piping connection holes 207, 208; and a shutter cover 238 arranged above the disk shutter 227 and having piping holes 239, 240 in positions corresponding to the two piping connection holes 207, 208;

cooling and heating operable states of the air conditioner and an operating state of the air conditioner except for the cooling and heating operable states being switched by rotating the disk shutter 227.

In accordance with a tenth structure of the present invention, a strainer is attached into each of the piping connection holes 207, 208.

In accordance with an eleventh structure of the present invention, driving means for rotating the rotary valve 212a is constructed by a compact motor 224.

In accordance with a twelfth structure of the present invention, the rotary valve 212a is formed in a butterfly shape.

In accordance with a thirteenth structure of the present invention, the rotary valve 212a is formed in a columnar shape such that two independent communicating holes are symmetrically formed in a body portion of the rotary valve 212a.

As mentioned above, the service valve with a four-way change-over valve in the second and third embodiments of the present invention has two piping connection holes for the service valve formed on an upper face of one valve seat having a thick disk shape. Four piping holes for the four-way change-over valve are formed on a lower face of the valve seat or in a valve chest in a central portion of the valve seat. A disk shutter is rotatably arranged on the upper face of the valve seat. The service valve is opened and closed by rotating this disk shutter. A rotary valve is arranged on the lower face of the valve seat or within the central valve chest. Cooling and heating operations of an air conditioner are switched by rotating this rotary valve. General three functions of two service valves and a four-way change-over valve are united as one function so that a compact service valve is provided.

Accordingly, the service valve can be attached to one portion of the air conditioner on an outdoor unit side. Therefore, it is not necessary to solder a pipe for connecting the service valve to the four-way change-over valve. Thus, the number of complicated operations in a manufacturing process of the air conditioner is reduced and a space for the service valve is totally reduced so that cost of the service valve is reduced.

It is generally necessary to open and close the service valve in two positions on liquid and gas sides. However, in the present invention, all opening and closing operations of the service valve can be performed by only unfastening and detaching a screw cap and rotating one driving shaft. Accordingly, the service valve can be easily treated and simply operated. Opening and closing states of the service valve displayed on the upper face of a shutter cover can be easily confirmed in accordance with the direction of a directional mark in an upper portion of the driving shaft. Accordingly, there is no error in operation of the service valve.

Further, the four-way change-over valve has the above-mentioned simplified structure and is operated by a compact motor. Accordingly, it is easy to process piping holes of the valve seat and assembly the four-way change-over valve. Further, no complicated mechanism for utilizing a difference in pressure is required to switch the cooling and heating operations. Accordingly, similar to the general service valve, the cooling and heating operations can be switched even in a high pressure difference state. Further, different from the general service valve, it is not necessary to hold an electric current flowing state of the service valve even in a heating state of the air conditioner.

Figure 16:
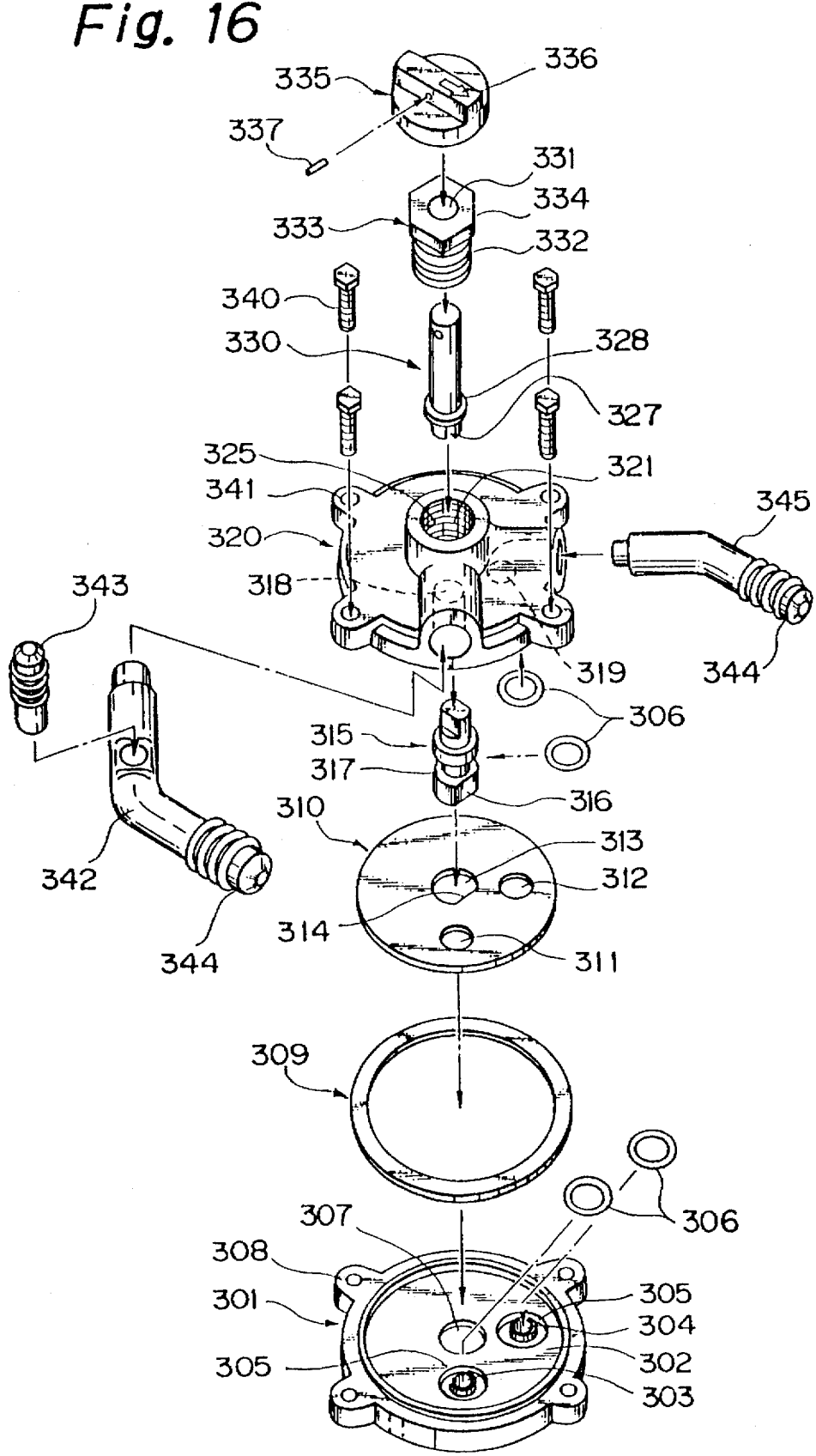
FIG. 16 is an exploded perspective view of a valve for an air conditioner in accordance with a fourth embodiment of the present invention.

FIG. 16 shows a valve for an air conditioner in accordance with a fourth embodiment of the present invention.

In FIG. 16, a flat valve case 301 has a circular recessed portion 302 with a shallow bottom on an upper face thereof. The flat valve case 301 also has two piping connection holes 303 and 304 shifted from each other at a phase angle of 90° on a concentric circle. Each of ring grooves 305 and 305 is formed on an upper face of each of the piping connection holes 303 and 304 in an outer circumference thereof. An O-ring 306 is fitted into each of the ring grooves 305.

A fitting hole 307 is formed in a central portion of the circular recessed portion 302. An end tip portion of a driving shaft 315 described later is fitted into this fitting hole 307. Reference numerals 308 and 309 respectively designate an attachment hole and a seal packing.

A disk shutter 310 is rotatably fitted into the circular recessed portion 302. The disk shutter 310 has passing holes 311 and 312 in positions corresponding to the piping connection holes 303 and 304 of the valve case 301. The passing holes 311 and 312 respectively have the same diameters as the piping connection holes 303 and 304. The disk shutter 310 has a non-circular driving hole 313 in a central portion thereof. No non-circular shape of the driving hole 313 is especially limited. For example, the driving hole 313 may be formed in the shape of a circular notch partially having a straight line portion 314 as shown in FIG. 16.

The driving shaft 315 is disposed to rotate the disk shutter 310. The driving shaft 315 has a slotted portion 316 at a lower end thereof formed such that the slotted portion 316 is inserted into the driving hole 313. The driving shaft 315 has a ring groove 317 in an intermediate portion thereof. An O-ring is fitted to this ring groove 317. An upper half portion of the driving shaft 315 is formed in an elliptical shape having a small diameter. Slotted portions are formed on both sides of this upper half portion of the driving shaft 315 at an upper end thereof.

A valve cover 320 can be airtightly aligned and attached to the flat valve case 301 through the seal packing 309. The valve cover 320 has piping holes 318 and 319 on an upper face thereof. The piping holes 318 and 319 are respectively formed in positions corresponding to the piping connection holes 303 and 304 of the valve case 310. Each of the piping holes 318 and 319 is extended in an L-shape until an outer circumferential side face of the valve cover 320. The valve cover 320 has a shaft hole 321 in a central portion thereof. The driving shaft 315 can be rotatably fitted into the shaft hole 321. Reference numeral 341 designates an attachment hole.

Figure 18:
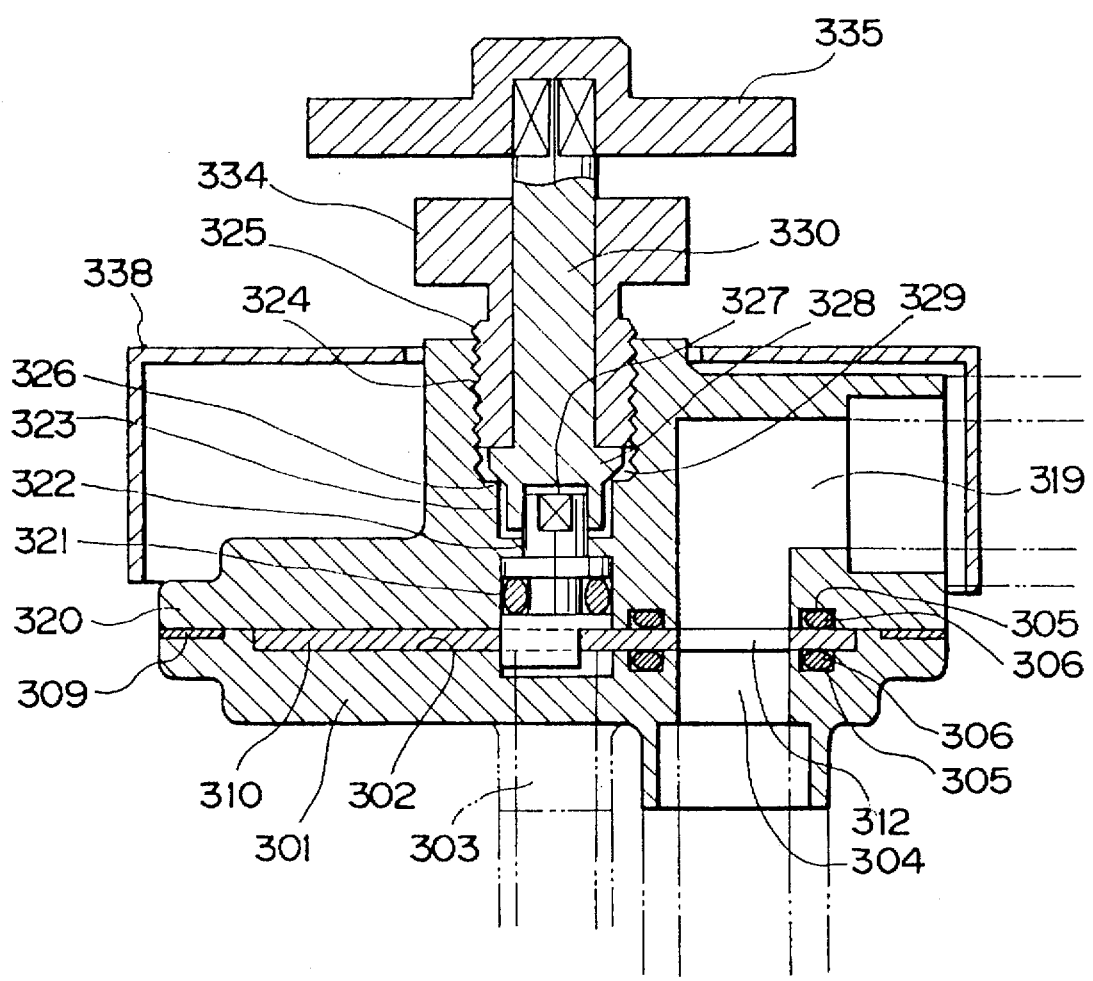
FIG. 18 is a longitudinal sectional side view of the valve for an air conditioner in accordance with the fourth embodiment of the present invention.

As shown in FIG. 18, the shaft hole 321 of the valve cover 320 has a diameter set such that a central portion of the driving shaft 315 is fitted into a lower face side of the shaft hole 321. A small diameter portion 322 is formed above the shaft hole 321. A stepped hole is formed above this small diameter portion 322 and is composed of a small diameter hole 323 and a large diameter hole 324. A female screw 325 is formed on an inner circumferential face of the large diameter hole 324. A chamfered valve seat 326 is formed at an upper end edge of the small diameter hole 323 of the stepped hole.

A ring groove 305 is also formed around a valve cover inner face side of the piping hole 319. An O-ring 306 is also fitted into this ring groove 305.

An operating shaft 330 has a fitting recessed portion 327 at a lower end thereof. The elliptical head portion of the driving shaft 315 is fitted into this fitting recessed portion 327. The operating shaft 330 has a flange 328 in a lower outer circumferential portion thereof. A lower face of this flange 328 is formed as a slanting face 329 and corresponds to a valve seat portion of the above stepped hole.

A lock bolt 333 has a hole 331 in a central portion thereof. The operating shaft 330 is inserted into this hole 331. The lock bolt 333 has a male screw 332 screwed into the female screw 325 in a lower outer circumferential portion thereof. A hexagon head 334 is formed in an upper outer circumferential portion of the lock bolt 333. A handle 335 has an arrow 336 on an upper face thereof. The handle 335 is fitted into an upper end portion of the operating shaft 330 and is fixed by a lock pin 337.

Figure 19:
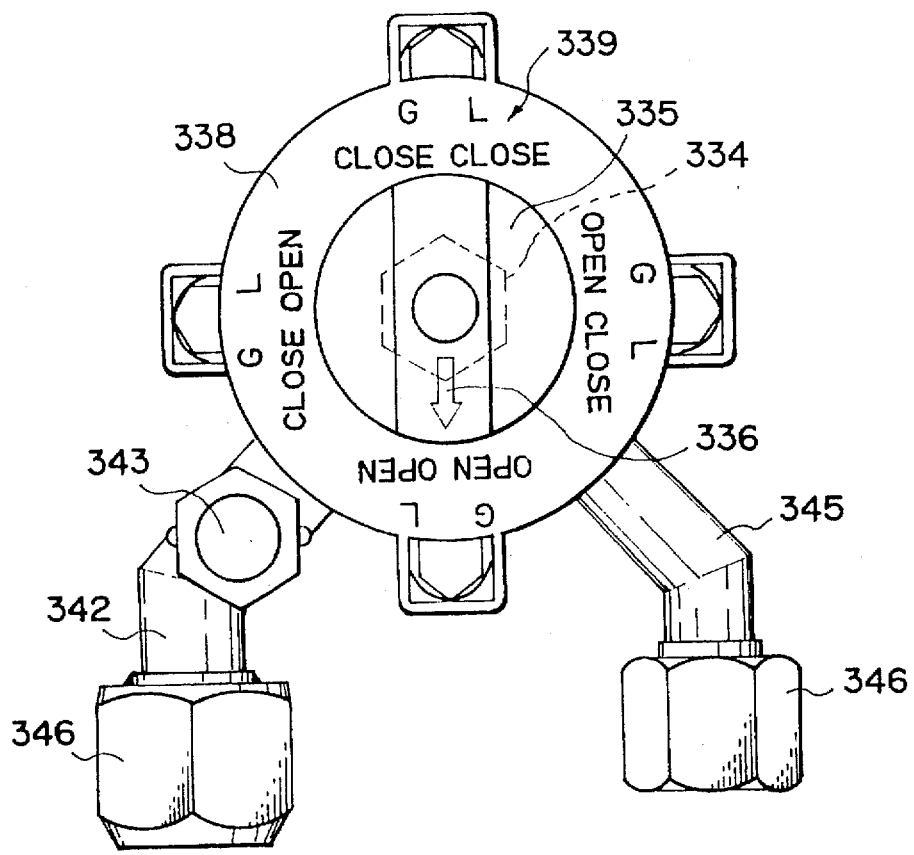
FIG. 19 is a plan view showing a case in which a valve cover in the fourth embodiment of the present invention is attached to the valve for an air conditioner.
Figure 20:
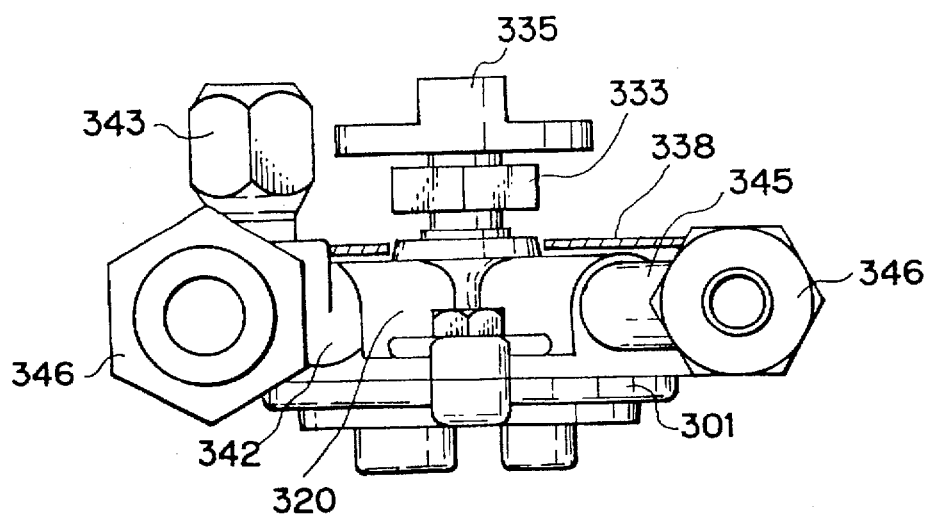
FIG. 20 is a front view showing only the valve cover of FIG. 19 in cross section.

As shown in FIG. 19, a valve cover 338 has a display portion 339 showing opening and closing states of the valve in rotational positions of the disk shutter 310 in four directions on an upper face of the valve cover 338 in an outer circumferential portion thereof.

Figure 17:
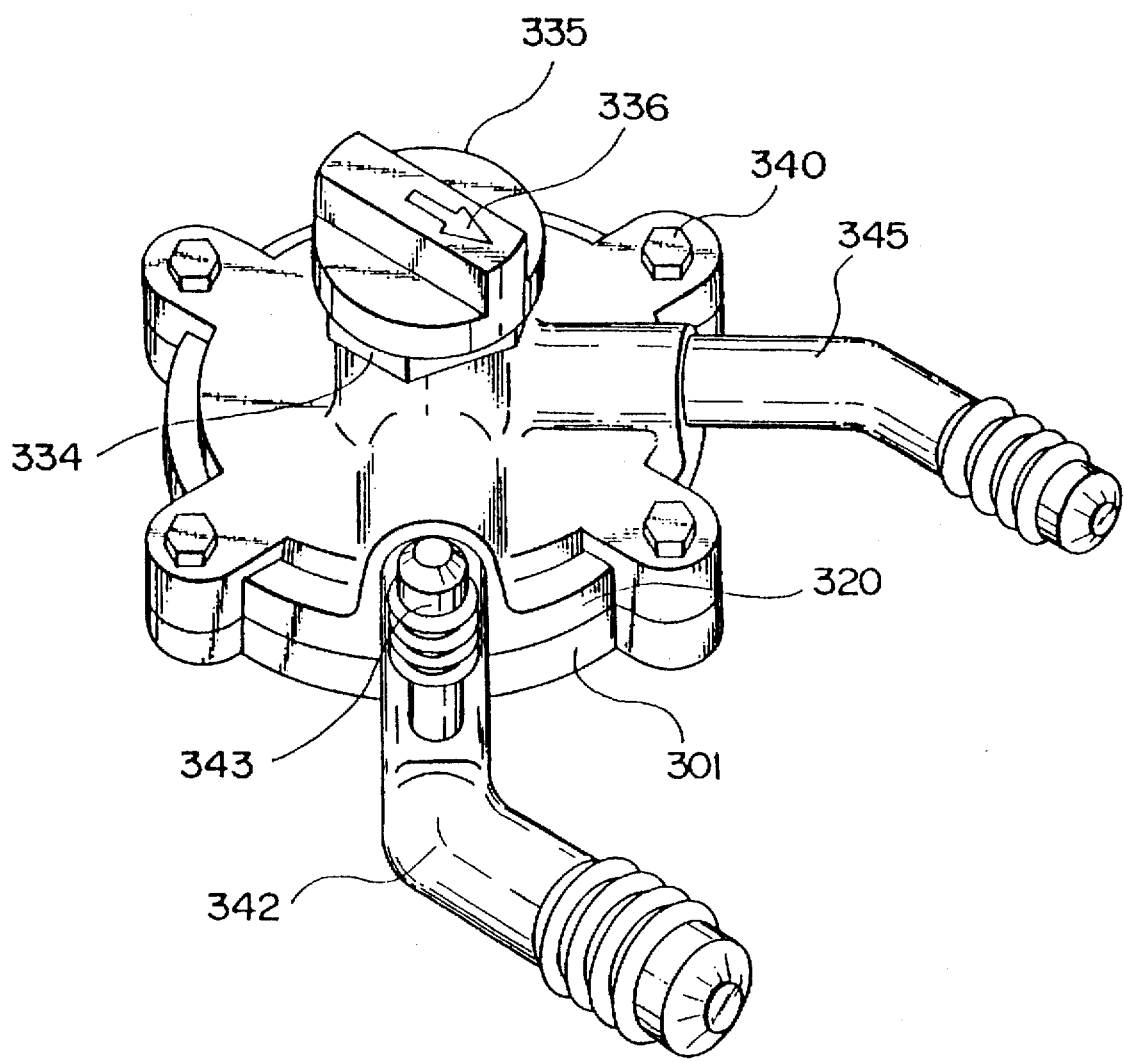
FIG. 17 is a perspective view of the valve for an air conditioner in accordance with the fourth embodiment of the present invention.

The O-rings 306, the disk shutter 310, the driving shaft 315 fitting the O-ring thereonto, etc. are assembled into the valve case 301 by attachment bolts 340. Thereafter, the valve case 301 is covered with the valve cover 320 through the seal packing 309. Thus, as shown in FIGS. 17 and 18, the disk shutter 310, the driving shaft 315, etc. are fixed and integrated with the valve case 301 by inserting and fixing each of the attachment bolts 340 into an attachment hole 341 of the valve cover 320 and the attachment hole 308 of the valve case. The integrated valve case is attached to an outdoor unit of the air conditioner.

A connection pipe 342 is connected to the piping hole 318 of the valve cover 320. The connection pipe 342 has a service port portion 343 having a valve core in an intermediate portion thereof. The connection pipe 342 has a flare face 344 at an end tip thereof. A connection pipe 345 is similarly connected to the piping hole 319. The connection pipe 345 also has a flare face 344 at an end tip thereof. As shown in FIG. 19, a flare nut 346 is normally screwed onto the end tip of each of the connection pipes 342 and 345.

The valve case 301 and the valve cover 320 mentioned above are formed by casting in the present invention, but can be also formed by press working. In this case, an L-shaped pipe is welded to locate an opening portion of each of the piping holes 318 and 319 in a side portion of the valve cover 320.

In the above fourth embodiment, the circular recessed portion 302 is formed on an upper face of the valve case 301. This circular recessed portion 302 may be arranged on a side of the valve cover 320. In this case, the upper face of the valve case 301 is formed in a flat shape.

Further, the driving hole 313 is formed in a central portion of the disk shutter 310. However, the driving shaft 315 may be integrally formed in the central portion of the disk shutter 310.

An operation of the above valve for an air conditioner will next be described.

The ⅜" piping connection hole 303 on a valve case side of the above valve structure is connected to the side of a four-way change-over valve of an outdoor unit. This four-way change-over valve side is called a gas side in the following description. The other ¼" piping connection hole 304 is connected to the side of a capillary tube of the outdoor unit. This capillary tube side is called a liquid side in the following description. A valve function in these connecting states will next be explained with reference to FIGS. 21a to 21d. FIGS. 21a to 21d show only the relation between the piping connection holes 303, 304 of the valve case 301 and the passing holes 311, 312 of the disk shutter 310. In the valve cover 320, the piping holes 318 and 319 are respectively arranged in positions corresponding to both the piping connection holes 303 and 304. Accordingly, when one or both of the piping connection holes 303 and 304 of the valve case 301 are respectively aligned with one or both of the passing holes 311 and 312 of the disk shutter 310, one or both of the piping connection holes 303 and 304 are respectively communicated with one or both of the piping holes 318 and 319 on the valve cover side.

Figure 21A:
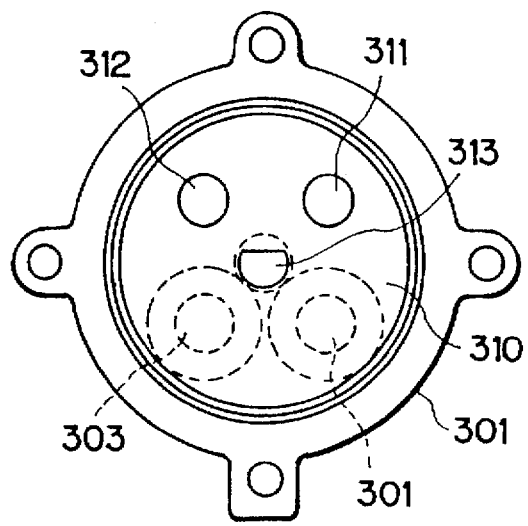
FIGS. 21a to 21d are plan views each showing the relation in position between a disk shutter and piping connection holes of a valve case in the fourth embodiment of the present invention.

FIG. 21a shows a state in which the valve for an air conditioner is forwarded and moved. In this state, no passing holes 311 and 312 of the disk shutter 310 are aligned with any one of the piping connection holes 303 and 304 of the valve case 301 so that the piping connection holes are closed on the gas and liquid sides. In this state, the piping holes 318 and 319 of the valve cover 320 are communicated with an evaporator on an indoor unit side.

Figure 21B:
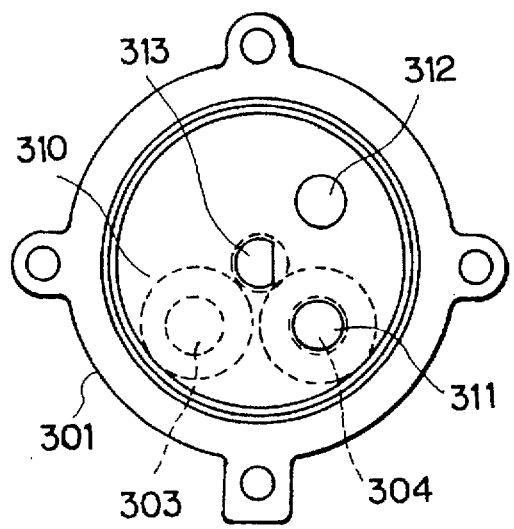

FIG. 21b shows an air purging state of the valve. In this state, the driving shaft 315 is rotated so that the passing hole 311 of the disk shutter 310 is aligned with the piping connection hole 304 on the liquid side. In this state, air stored within piping on an indoor unit side is pushed out by refrigerant within an outdoor unit so that this air is discharged into the air by pushing the valve core within the service port portion 343. Thus, the indoor unit is also filled with the refrigerant.

Figure 21C:
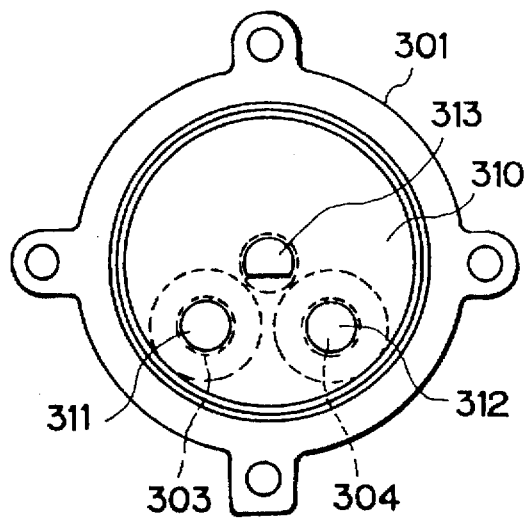

FIG. 21c shows a state in which the air conditioner is operated. In this state, the passing holes 311 and 312 of the disk shutter 310 are respectively aligned with the piping connection holes 303 and 304. In this state, the refrigerant is circulated between the outdoor and indoor units so that a cooling or heating operation of the air conditioner can be performed.

Figure 21D:
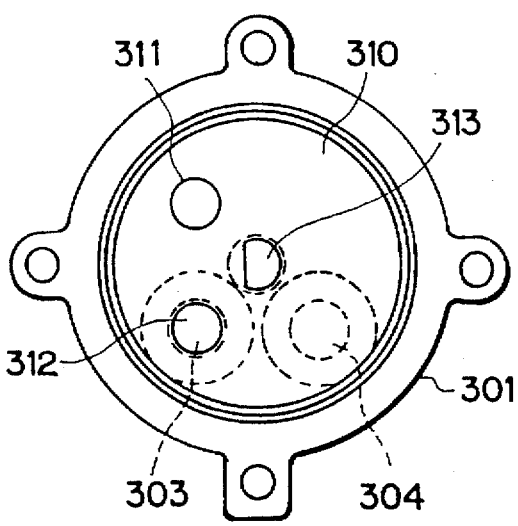

FIG. 21d shows a pumping-down state of the valve for the air conditioner. In this state, the passing hole 312 of the disk shutter 310 is aligned with the piping connection hole 303 on the gas side, and the piping connection hole 304 on the liquid side is closed. In this state, when the air conditioner is operated, the refrigerant on the indoor unit side is sucked by a compressor and is returned onto the outdoor unit side. Thereafter, if the state shown in FIG. 21a is set by rotating the disk shutter 310, each of the piping connection holes is completely closed so that the air conditioner can be freely detached and moved.

A position of the disk shutter 310 and opening and closing states of the above holes on the liquid and gas sides in this disk shutter position can be visualized by a display on the upper face of the valve cover 338 and the arrow 336 of the handle 335 shown in FIG. 19. In FIG. 19, "G" shows the above gas side and "L" shows the above liquid side. When the handle 335 is operated, the handle 335 is rotated in a state in which the hexagon head 334 of the lock bolt 333 shown in FIG. 18 is unfastened by a spanner. This lock bolt 333 is fastened when the air conditioner is forwarded, moved and operated. Thus, the slanting face 329 on a lower flange face of the operating shaft 330 comes in press contact with a valve seat portion of the stepped hole in a central portion of the valve cover 320 so that a metallic touch seal is formed.

For example, it is possible to provide a seal function by forming a copper packing, etc. instead of this metallic touch seal on the lower face of the flange 328 and an upper face of the small diameter hole 323 of the stepped hole.

In the above fourth embodiment, the stepped hole is formed in an upper central portion of the valve cover 320 to rotate the driving shaft 315. The disk shutter 310 is rotated by using the operating shaft 330 having a flange, the lock bolt 333, the handle 335, etc. in this stepped hole. However, the operating shaft, etc. are not necessarily required if the O-ring 306 arranged around the driving shaft 315 sufficiently seals the shaft hole 321 in the central portion of the valve cover so that no refrigerant is leaked. In this case, for example, if the driving shaft 315 can be rotated, a simple T-shaped handle and an L-shaped handle as a hexagon shaft may be used.

The valve cover 338 having the display portion 339 showing opening and closing states of the valve is arranged on an upper face of the valve in an outer circumferential portion thereof. However, this valve cover 338 is not necessarily required. For example, the display portion 339 may be directly formed on an upper face of the valve cover 320. In this case, the valve cover 338 is omitted.

In the above fourth embodiment, the piping connection holes 303 and 304 are shifted from each other at a phase angle of 90° to provide four states composed of operating, forwarding-moving, pumping-down and air purging states of the air conditioner. When no air purging state is required, the piping connection holes 303 and 304 may be shifted from each other at an angle of 120°.

As mentioned above, in accordance with a fourteenth structure of the present invention, a valve for an air conditioner comprises:

a flat valve case 301 having a circular recessed portion 302 with a shallow bottom on an upper face thereof and having two piping connection holes 303, 304 shifted from each other at a phase angle of 90° or 120° on a concentric circle;

a disk shutter 310 rotatably arranged within the circular recessed portion 302 of the flat valve case 301 and having passing holes 311, 312 in positions corresponding to the piping connection holes 303, 304;

the disk shutter 310 further having a driving shaft 315 in a central portion thereof; and a valve cover 320 having piping holes 318, 319 in positions corresponding to the two piping connection holes 303, 304;

the valve cover 320 further having a shaft hole 321 in a central portion thereof formed such that the driving shaft 315 can be rotatably fitted into this shaft hole 321; and the valve cover 320 being fixed to the valve case 301 such that the valve cover 320 airtightly covers the disk shutter 310 and the driving shaft 315 from above.

In accordance with a fifteenth structure of the present invention, the valve case 301 and the valve cover 320 are molded by press working.

In accordance with a sixteenth structure of the present invention, each of the piping holes 318, 319 of the valve cover 320 is communicated with a side face of the valve cover.

In accordance with a seventeenth structure of the present invention, the valve further comprises:

a stepped hole formed in an upper half portion of the shaft hole 321 in the central portion of the valve cover;

the stepped hole having a large diameter hole 324 in an upper portion thereof;

the stepped hole having a small diameter hole 323 in a lower portion thereof;

a female screw 325 formed on an inner circumferential face of the upper large diameter hole 324;

an operating shaft 330 having a fitting recessed portion 327 at a lower end thereof fitted onto a head portion of the driving shaft 315;

the operating shaft 330 further having a flange 328 in a lower outer circumferential portion thereof;

a lock bolt 333 having a hole 331 in a central portion thereof for receiving the operating shaft 330;

the lock bolt 333 having a male screw 332 in a lower outer circumference thereof;

the lock bolt 333 having a hexagon head 334 in an upper outer circumference thereof; and a handle 335 arranged in a head portion of the operating shaft 330; and the valve is constructed by fitting the head portion of the driving shaft 315 into the fitting recessed portion 327 of the operating shaft 330, and screwing the lock bolt 333 into the female screw 325 above the stepped hole through the operating shaft 330.

In accordance with an eighteenth structure of the present invention, a seal function is provided between a lower face of the flange 328 of the operating shaft 330 and an upper end edge of the small diameter hole 323 in the stepped hole.

In accordance with a nineteenth structure of the present invention, an arrow 336 is formed in an upper portion of the handle 335;

an upper portion of the valve cover 320 is covered with a second valve cover 338: and a display 339 showing opening and closing states of the valve in a rotational position of the disk shutter 310 is formed on an upper face of this second valve cover 338 in an outer circumferential portion thereof.

As mentioned above, in the valve for an air conditioner in the fourth embodiment, the disk shutter is rotatably arranged within one flat valve case. The valve is opened and closed by rotating this disk shutter. Accordingly, the valve is reduced in height so that the valve is made compact. Further, the valve has a good appearance in a state in which the valve is attached onto the side of an outdoor unit. All opening and closing operations of the valve can be performed by only unfastening the lock bolt and rotating the handle so that the valve is easily treated and simply operated. Further, opening and closing states of the valve display on an outer circumferential face of the valve cover can be easily confirmed by the direction of a displayed arrow in an upper portion of the handle so that there is no error in operation of the valve.

Many widely different embodiments of the present invention may be constructed without departing from the spirit and scope of the present invention. It should be understood that the present invention is not limited to the specific embodiments described in the specification, except as defined in the appended claims.

What is claimed is:

1. A valve for an air conditioner comprising:

a flat valve case having a circular recessed portion with a shallow bottom on an upper face thereof and having two piping connection holes shifted from each other at a phase angle of 90° or 120° on a concentric circle;

a disk shutter rotatably arranged within the circular recessed portion of the flat valve case and having passing holes in positions corresponding to said piping connection holes;

the disk shutter further having a driving shaft in a central portion thereof; and a valve cover having piping holes in positions corresponding to said two piping connection holes;

the valve cover further having a shaft hole in a central portion thereof formed such that said driving shaft can be rotatably fitted into this shaft hole, the valve cover being fixed to said valve case such that the valve cover airtightly covers the disk shutter and the driving shaft from above;

a stepped hole formed in an upper half portion of the shaft hole in the central portion of the valve cover;

the stepped hole having a large diameter hole in an upper portion thereof;

the stepped hole having a small diameter hole in a lower portion thereof;

a female screw formed on an inner circumferential face of the upper large diameter hole;

an operating shaft having a fitting recessed portion at a lower end thereof fitted onto a head portion of said driving shaft;

the operating shaft further having a flange in a lower outer circumferential portion thereof;

a lock bolt having a hole in a central portion thereof for receiving said operating shaft;

the lock bolt having a male screw in a lower outer circumference thereof;

the lock bolt having a hexagonal head in an upper outer circumference thereof; and a handle arranged in a head portion of the operating shaft; and the valve is constructed by fitting the head portion of the driving shaft into the fitting recessed portion of the operating shaft, and screwing the lock bolt into the female screw above the stepped hole through said operating shaft.

2. A valve for an air conditioner as claimed in claim 1, wherein the valve case and the valve cover are molded by press working.

3. A valve for an air conditioner as claimed in claim 1, wherein each of the piping holes of the valve cover is communicated with a side face of the valve cover.

4. A valve for an air conditioner as claimed in claim 1, wherein a seal function is provided between a lower face of the flange of the operating shaft and an upper end edge of the small diameter hole in the stepped hole.

5. A valve for an air conditioner as claimed in claim 1 or 4, wherein an arrow is formed in an upper portion of the handle;

an upper portion of the valve cover is covered with a second valve cover; and a display showing opening and closing states of the valve in a rotational position of said disk shutter is formed on an upper face of this second valve cover in an outer circumferential portion thereof.

* * * * *